United States Patent [19]

Kawai et al.

[11] Patent Number: 4,810,542
[45] Date of Patent: Mar. 7, 1989

[54] MULTILAYERED TUBE FOR DRAW MOLDING AND MULTILAYERED CONTAINER UTILIZING THE TUBE

[75] Inventors: Syuji Kawai, Kurashiki; Seio Anzai, Okayama; Toshinori Ishii, Asakuchi; Kenji Shirano, Kurashiki; Kunihiko Shimamura, Okayama; Toshimasa Kanemitsu, Fukuyama; Keiji Matsumura, Kurashiki, all of Japan

[73] Assignee: Kuraray Co., Ltd., Kurashiki, Japan

[21] Appl. No.: 148,358

[22] Filed: Jan. 25, 1988

[30] Foreign Application Priority Data

Feb. 9, 1987 [JP] Japan .................. 62-28877

[51] Int. Cl.$^4$ ............... B65D 23/00; B32B 27/08; B29C 45/14
[52] U.S. Cl. .................. 428/36.7; 264/512; 264/515; 428/213; 428/480; 428/483; 428/522; 428/542.8; 428/36.91
[58] Field of Search .......... 264/512, 515, 540; 428/35, 36, 213, 480, 483, 520, 522, 542.8; 215/1 C

[56] References Cited

U.S. PATENT DOCUMENTS

| | | | |
|---|---|---|---|
| 4,395,221 | 7/1983 | Herrington | 264/514 |
| 4,436,778 | 3/1984 | Dugal | 264/515 |
| 4,528,219 | 7/1985 | Yamada et al. | 428/35 |
| 4,564,541 | 1/1986 | Taira et al. | 428/35 |
| 4,741,936 | 5/1988 | Nohara et al. | 428/35 |

*Primary Examiner*—Ellis P. Robinson
*Assistant Examiner*—James J. Seidleck
*Attorney, Agent, or Firm*—Kramer, Brufsky & Cifelli

[57] ABSTRACT

The tube of the present invention has no or very small local minute nonuniformity in thickness of EVOH layer, and therefore drawn-formed articles such as blow bottle obtained by draw molding the tube have no streaks and are superior in appearance.

3 Claims, 7 Drawing Sheets

S—Streak

Circumpherential distance in the cross section of the EVOH layer in bottle

Circumpherential distance in the cross section of the EVOH layer in bottle

MULTILAYERED TUBE FOR DRAW MOLDING AND MULTILAYERED CONTAINER UTILIZING THE TUBE

BACKGROUND OF THE INVENTION

1. Field of the Invention

The present invention relates to a multilayered tube comprising a saturated polyester (hereinafter referred to as PES) as the inner and the outer layers, a saponified product of ethylene-vinyl acetate copolymer (hereinafter referred to as EVOH) as the intermediate layer, and an adhesive resin (hereinafter referred to as TR) layer between the PES layer and the EVOH layer; and a multilayered container utilizing the tube; as well as methods of producing the tube and the container.

2. Description of the Prior Art

PES, represented by polyethylene terephthalate (hereinafter referred to as PET) is, because of its high transparency, heat resistance, mechanical properties, and so on, widely used not only for fibers and films but for containers for beverages and foods or as films for food packaging. In the case where PES is used for containers for foods or films for food packaging, though it has by itself a certain degree of gas barrier property and so suitable for preserving foods, there is still expected a higher gas barrier property depending on the type of foods or beverages to be filled or packed therein. Thereupon, attempts have been made to have EVOH, which resin has a higher gas barrier property, laminate onto PES to obtain tubes, blow bottles and films having multilayered structures. For example, JPA's Nos. 108162/1978, 77144/1981, 128516,1982, U.S. Pat. No. 4,504,531, and JPA No. 199237/1984 disclose tubes and blow bottles which have laminted the two resins. However, when a composite of PES and EVOH is formed into a biaxially drawn multilayered container, there is observed in the appearance of the container (bottle) an abnormal nonuniformity looking like streaks to make the bottle unsatisfactory. FIG. 10 is an elevation of a bottle of bad appearance, showing streaky nonuniformities. This streakiness, S (hereinafter referred to simply as streaks), markedly deteriorates the commercial value of the bottle, and the bottle can not stand comparison with monolayered bottles of PET which are sold commercially.

SUMMARY OF THE INVENTION

The present inventors thought that such streaks of the blow bottles can not fully be eliminated by improving uniformities in thickness of the tube or of EVOH layer or each layer, and that the streaks are caused by poor drawability of EVOH used as a gas barrier resin, and have carried out a series of studies centering on improving blow molding conditions such as blow ratio, blow rate, blow temperature, etc. and various manufacturing conditions. However it has turned out that there is a limit in improvements by blow conditions or by various manufacturing conditions, and it has been difficult to get the desired bottle having no streaks.

The present inventors have further proceeded with intensive studies on the streaks problem and found unexpectedly that the fundamental factor of causing streaks is the local minute nonuniformity in thickness of a small region of EVOH layer in the tube, in other words such local minute nonuniformity in thickness governs the streak. In more detail, there was found that the local minute roughness of EVOH layer in the tube causes, in the course of biaxial draw blowing, bigger irregularities in the EVOH layer and bottle wall thickness. The local minute nonuniformity in thickness generates continuously when a tube is molded, along the flow at the junction in the die, and appears as "streaks" being continuous streaky defects along the machine direction in the body. It is indispensable to eliminate such local minute roughnesses.

The present invention has been achieved based on the above findings, and provides a multilayered tube used for draw molding, which comprises a saturated polyester as the inner and outer layers, a saponified product of ethylene-vinyl acetate copolymer having an ethylene content of 20 to 55 mol% and a saponification degree of vinyl acetate component of at least 96 mol%, and an adhesive resin layer interposed between the saturated polyester layer and the saponified product of ethylene-vinyl acetate copolymer layer; which satisfies the conditions of the following formulae I- ① to I- ③:

$$50\mu \leq \bar{E} \leq 1000\mu \quad \text{I-①}$$

$$1 - 0.01\bar{H} \leq E/\bar{E} \leq 1 + 0.01\bar{H} \quad \text{I-②}$$

$$\bar{E}/(\bar{A}+\bar{B}) \leq 0.2 \quad \text{I-③}$$

wherein,
- E: wall thickness at any spot of the layer of a saponified product of ethylene-vinyl acetate copolymer ($\mu$)
- $\bar{E}$: average wall thickness of the layer of a saponified product of ethylene-vinyl acetate copolymer ($\mu$)
- $\bar{H}$: average outer diameter of the tube (mm)
- $\bar{H}$: average wall thickness of the inner layer of the saturated polyester ($\mu$)
- $\bar{B}$: average wall thickness of the outer layer of the saturated polyester ($\mu$);

and in which the layer of a saponified product of ethylene-vinyl acetate copolymer substantially satisfies the following formula II:

$$\frac{Emax - Emin}{\frac{1}{2}(Emax + Emin)Q} \leq 10^{-5} \times \left( \frac{7.7}{\log Q - 0.73} + 2.2 \right) \quad \text{II}$$

wherein: Emin: the minimum wall thickness in $\mu$ of the layer of a saponified product of ethylene-vinyl acetate copolymer, in the cross section perpendicular to the direction of the tube length, at a point between any point $P_n$ and a point $P_{n+1}$ which is distant from $P_n$ by Q=100 to 500$\mu$ in circumferential distance on the outer surface of the layer, Emax: the maximum wall thickness in $\mu$ of the above specified region between $P_n$ and $P_{n+1}$.

$$K = 10^{-5} \times \left( \frac{7.7}{\log Q - 0.73} + 2.2 \right),$$

and the abscissa represents Q and the ordinate represents K.

Figure 4:
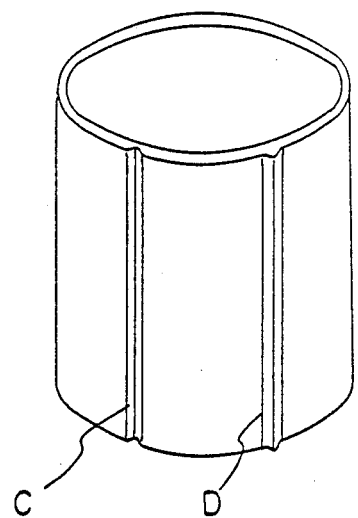

FIG. 4 is a perspective view of the EVOH layer only of the tube.

Figure 5:
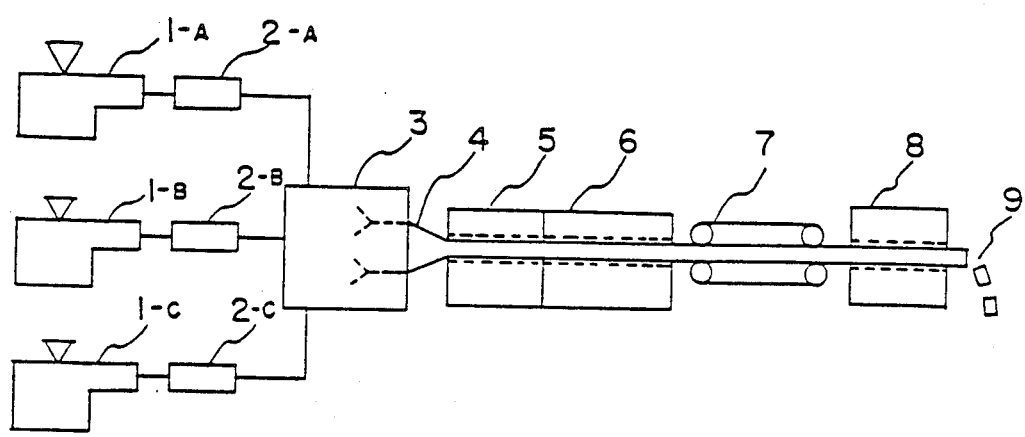

FIG. 5 shows the manufacturing process for the tube according to the present invention.

Figure 6A:
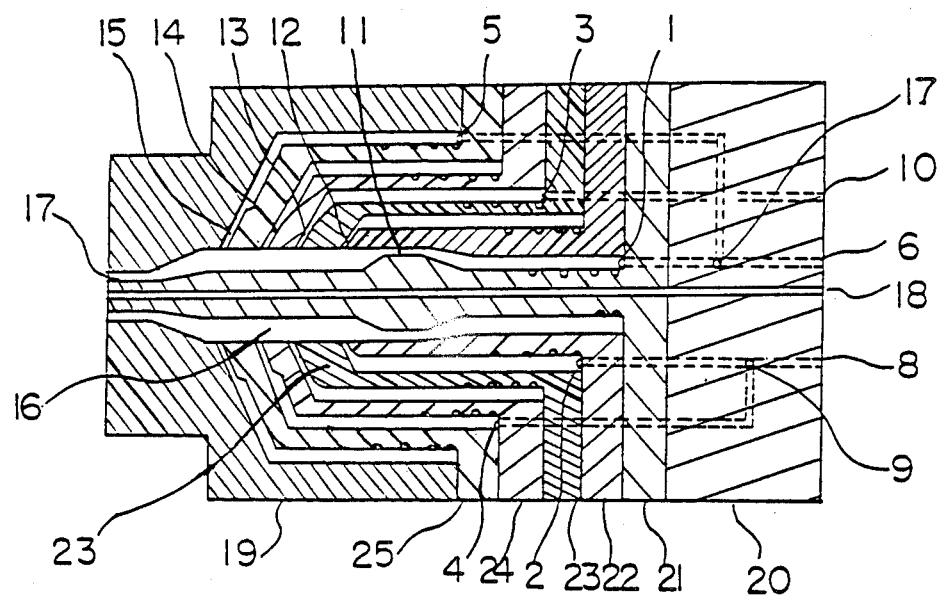
Figure 6B:
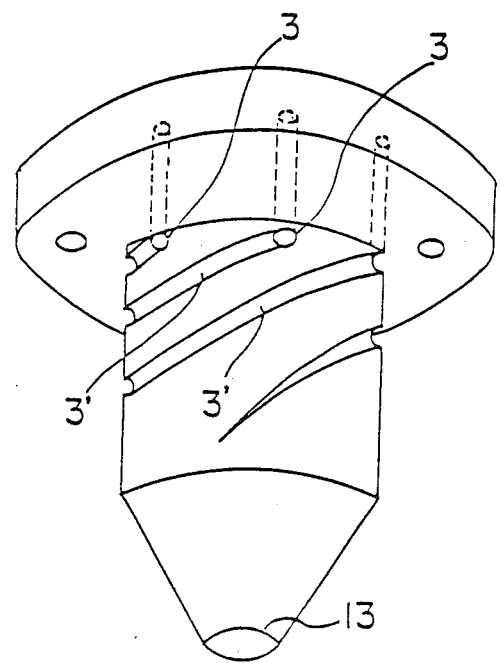
Figure 7A:
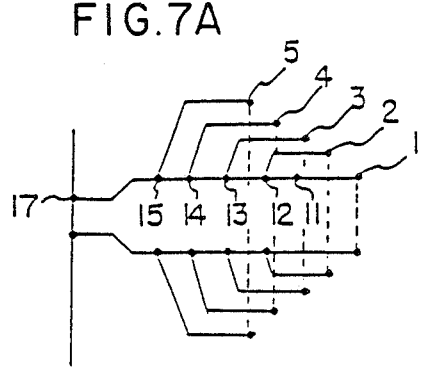
Figure 7C:
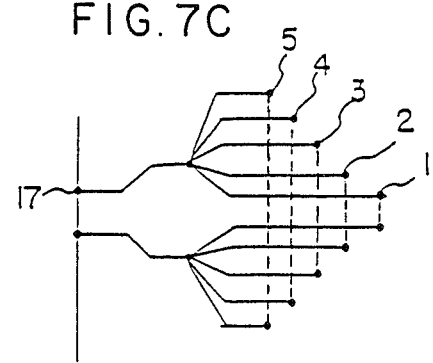
Figure 7B:
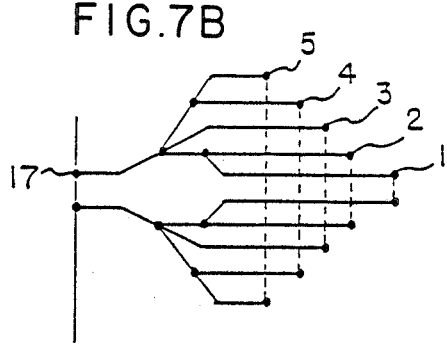
Figure 7D:
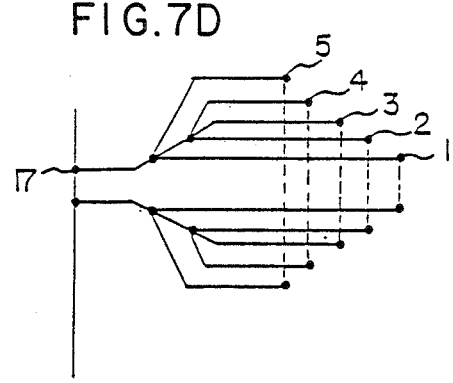

FIG. 6-(1) is a sectional view of a co-extrusion die used in manufacturing the tube according to the present invention, and FIG. 6-(2) is a perspective view of a mandrel having a spiral structure. FIGS. 7-(1) to (4) are diagrammatical views of other co-extrusion dies used in manufacturing the tube of the present invention.

Figure 8:
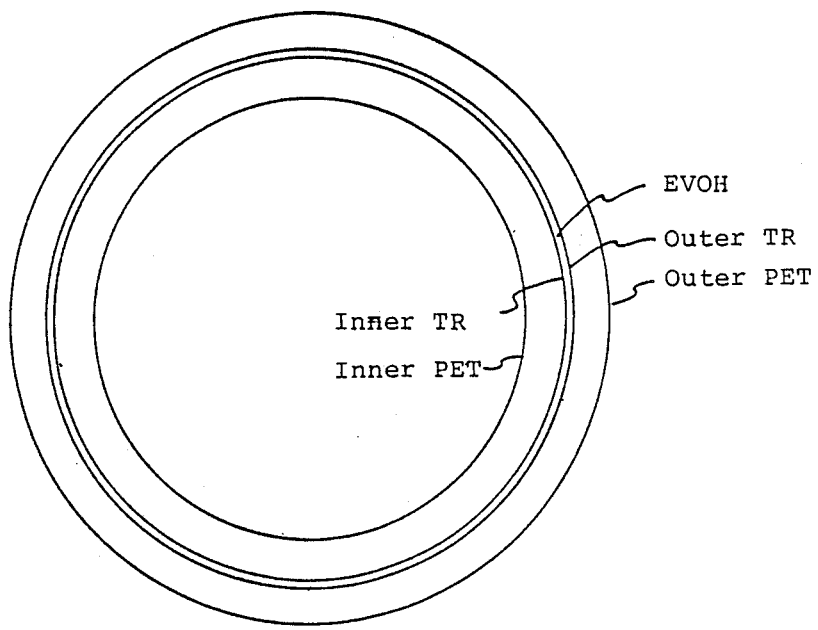

FIG. 8 shows a sectional view of the tube in Example 1.

Figure 9:
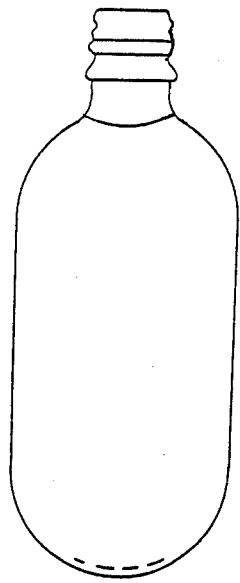

FIG. 9 is an elevation of the biaxially drawn blow bottle having no streaks obtained from the tube of Example 1.

Figure 10:
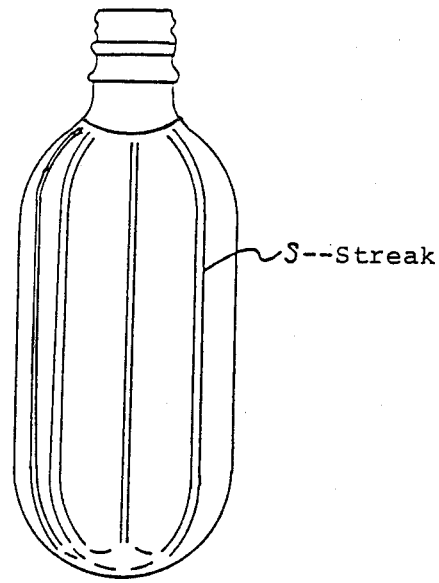

FIG. 10 is an elevation of the biaxially drawn blow bottle having streaks obtained from the tube of Comparative Example 1.

Figure 11:
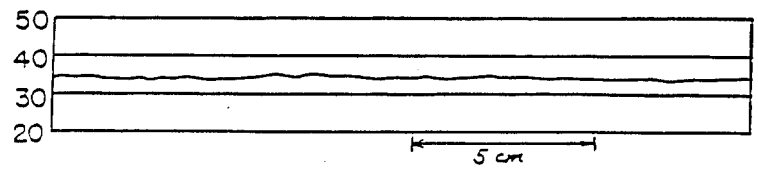

FIG. 11 shows the thickness distribution of the EVOH layer of the bottle prepared in Example 1.

Figure 12:
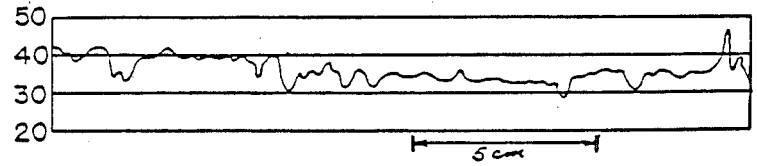

FIG. 12 shows the thickness distribution of the EVOH layer of the bottle prepared in Comparative Example 1, wherein the abscissa represents the circumpherential distance in the cross section and the ordinate represents the thickness.

Figure 13A:
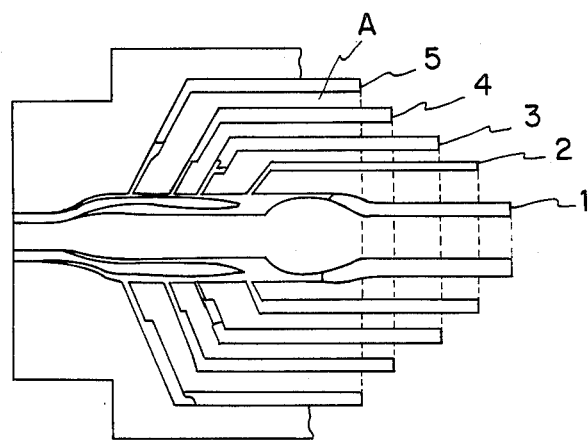
Figure 13B:
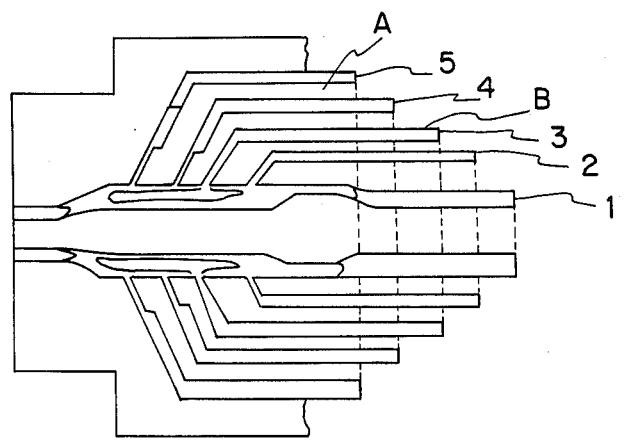

FIG. 13-(1) is a diagrammatical drawing of a co-extrusion die used in manufacturing the tube according to the present invention when TR is introduced; and (2) when TR and EVOH are introduced.

DETAILED DESCRIPTION OF THE INVENTION

What is essential in the present invention is that the EVOH layer as the intermediate layer of a multilayered tube satisfy the above equation II, that is, to eliminate in minute regions any local nonuniformity in thickness.

$$\frac{E\max - E\min}{\frac{1}{2}(E\max + E\min)Q} = Y$$

greatly infuences streaks in bottles and when Y exceeds $$10^{-5} \left( \frac{7.7}{\log Q - 0.73} + 2.2 \right),$$

the local minute nonuniformity in thickness becomes greater, which as the EVOH layer is drawn will cause nonuniformity in the drawing behavior to cause streaks to generate.

The present inventors have carried out a number of basic experiments and molding tests and found out as a result therefrom that, for the purpose of obtaining a biaxially drawn blow bottle of 3-kind/5-layer of PES/TR/EVOH/TR/PES having substantially no irregular streaky defects in appearance, i.e. streaks, it is not effective to simply improve structure of the multilayered tube such as thickness control of the EVOH layer and eliminate thickness irregularity of TR layer; but it is necessary to eliminate local minute variation in thickness of the EVOH layer in the tube, that is, the condition (II) must be fulfilled. The problem of streaks generation caused by poor drawability of EVOH is usually not applicable to other multilayered structures comprising PES, polyethylene, polypropyrene, nylon, etc., and not containing EVOH.

In case of all PET bottles or all PET multilayered bottles, such minute local variation in thickness will, thanks to a very high drawability of PET resin, not promote thickness nonuniformity of the PET layer causing no streaks to form. However, since EVOH resin is, compared with PET resin, very poor in drawability, particularly in uniform drawability, even a small variation in thickness will cause thin spots to preferentially be drawn to a greater extent while thick portions remain to be drawn at a low ratio, which in turn remain as nonuniformities in the EVOH layer, and further as big irregularities in thickness of the bottle. Because such a minute nonuniformity in thickness is the nonuniformity of flow which generates continuously in the course of tube molding and generates continuously in the direction of tube flow (machine direction), it remains enlarged on the bottle body as a streaky thickness irregularity which extends continuously in the machine direction. This poorly drawn irregularity of EVOH layer influences the drawing of TR layer and PET layer; and a big variation, i.e. poorly drawn portions in EVOH layer will, causing poor drawability of TR and PET layers, remain enlarged in the whole wall of the bottle, which makes bigger nonuniformity in light refractivity resulting in a streaky appearance i.e. streaks.

In the present invention, to satisfy substantially the above condition II means that all or almost all of spots in the EVOH layer in the cross section of the tube satisfy the condition II, whereas such minute local thickness irregularities (not satisfying the condition II) that would not cause streaks to generate upon drawing may be allowed to exist. In this case however, it is not preferred that a spot in a cross section of the tube and a spot in another cross section 1 to 2 cm longitudinally distant from the first cross section, both points being continuous along the longitudinal direction of the tube, do not simultaneously satisfy the conditon II, since the spots will form a streak upon drawing. Only one spot of the above two in EVOH layer not satisfying the condition II may sometimes not cause a streak.

Emax and Emin are determined by cutting the tube at the two points which are 1 to 2 cm longitudinally distant from each other, and by measuring the maximum and minimum thicknesses in the range Q=100 to 500μ in the two cross sections. Those satisfying the condition II in both of the cross sections, as well as those in which one of the two sections contains a spot not satisfying the condition II while the other section satisfy the condition II is included in the present invention. On the other hand, when in one cross section there is a spot which does not satisfy the condition II and in another cross section there is a spot linked lineally with the first spot which does not satisfy the condition II either, such tube is excluded from the present invention, since they will form a streak upon drawing.

The above will be, with reference to an example, elucidated in more detail below.

In a multilayered tube having $\overline{H} \approx 30$ mm and a thickness of EVOH layer of $\overline{E} = 300\mu$, the allowable range for the irregularity is 210 to 390$\mu$ calculated from the inequality I-②. $1 - 0.01\overline{H} \leq E/\overline{E} \leq 1 + 0.01\overline{H}$. While the total range of thickness is as large as $\pm 90\mu$, the approximate thickness gradient is, when regarding the tube wall as a plane, calculated for the minimum value as follows:

$$(390\mu - 210\mu)/15 \times \pi \times 10^3 \text{(semicircle of tube)} \approx 0.0038$$

Suppose the above thickness nonuniformity varies smoothly along the entire circumference in the allowable range, the local thickness difference between any two spots for instance $Q = 500\mu$ circumferentially distant from each other is $500\mu \times 0.0038 \approx$ about $2\mu$ and fully satisfies the condition of local minute thickness nonuniformity:

Condition II: $\dfrac{Emax - Emin}{\frac{1}{2} \times 600 \times 500} \leq 10^{-5} \times$ $$\left( \dfrac{7.7}{\log 500 - 0.73} + 2.2 \right),$$

that is, satisfies $Emax - Emin \leq$ about $9\mu$, so that the biaxially drawn blow bottles obtained from the tube do not form any streaks.

However, in contrast with the above, for instance in the case of an EVOH layer and a remarkable uniform thickness having a total thickness range of 290$\mu$ to 310$\mu$, which range is far below the preceding example, if the local thickness difference between two spots not less than 500$\mu$ apart from each other exceeds the allowable limit of Condition II: $(Emax - Emin) =$ about $9\mu$, e.g. with $Q = 500$ and $(Emax - Emin) = 10\mu$, the biaxially drawn blow bottles obtained from the tube will have streaks and bad appearances. Further in the case where the thickness difference between two points $Q = 100 \mu$ apart from each other exceeds the allowable limit of Condition II: $(Emax - Emin) =$ about 2.5$\mu$, e.g. with $Q = 100\mu$, $(Emax - Emin) =$ about $3\mu$, streaks will also generate.

The above facts show that the allowable range of local minute thickness nonuniformity of an EVOH layer varies greatly depending on the size of the corresponding local minute segment. Though drawing behavior is not completely understood, variations in the thicknesses of local portions probably have a strong influence on that behavior among other factors relative to the wall thickness of the EVOH layer.

Figure 2:
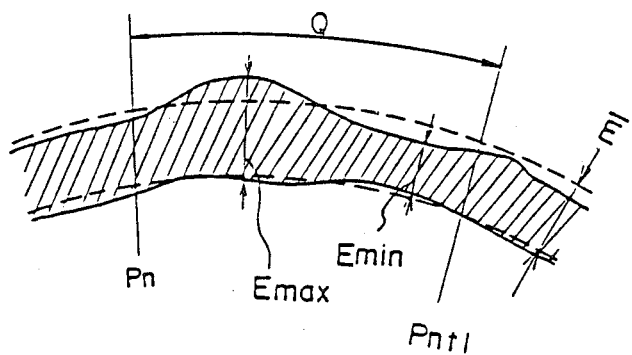
FIG. 2 shows a diagrammatical drawing showing local minute nonuniformity in the thickness of the EVOH layer {Emax and Emin are the maximum thickness and the minimum thickness respectively between points $P_n$ and $P_{n+1}$ which is circumferentially distant from $P_n$ by Q$\mu$}

FIG. 2 is a diagrammatical view of the cross section of the tube according to the present invention showing local minute nonuniformity in the thickness of the EVOH layer.

Figure 3:
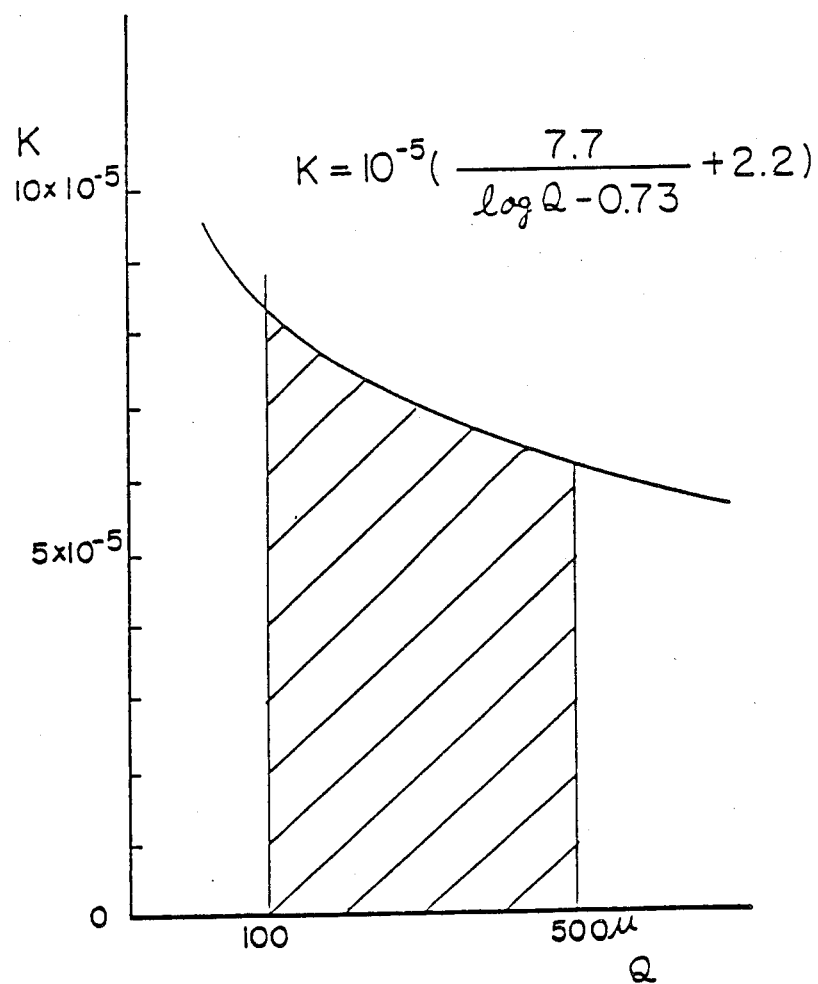
FIG. 3 shows a curve bounding the acceptable region (hatched) for the local minute nonuniformity in thickness of the tube according to the present invention, which is expressed by the following equation.

FIG. 3 shows the acceptable region (hatched) for the local minute nonuniformity in thickness of the tube according to the present invention, wherein the abscissa represents $Q(\mu)$ and the ordinate represents:

$$K = 10^{-5} \times \left( \dfrac{7.7}{\log Q - 0.73} + 2.2 \right)$$

The graph in FIG. 3 shows that the variation in the acceptable range of thickness nonuniformity forms a gradient which is a function of the length Q of the local minute segment. According to FIG. 3, the acceptable value of the thickness nonuniformity (gradient K) becomes smaller as the minute region Q becomes longer. This means that even a gentle slope will increase the drawing nonuniformity which causes streaks. The inequality II is for a range $Q = 100$ to $500\mu$. However, similar tendency is also found beyond this range. Though the gradient element in the thickness variation has a deep relation with a factor, in the actual molding practice such an irregularity that, while satisfying the condition II in a minute region of substantially $Q < 100\mu$, would cause streaks generation that would never be formed as judged from interfacial characteristics of polymer flow. Therefore it is sufficient to fix the lower limit of Q to be $100\mu$. Similar correlation exists also above $Q = 500\mu$. For instance even when Q is as wide as $Q = 2000\mu$, there is no big difference in gradient, and so it is sufficient to substantially observe a region of $500\mu$ for the purpose of checking. Further when the magnification or analytical performance of a microscope is insufficient, a rough measurement in a range of about $Q = 500\mu$ and checking the gradient will be effective in practice, especially for process control and the like. Accordingly, for EVOH layer of a multilayered tube molded at a steady rate, those local thickness irregularities observed in a region $Q < 100\mu$ are well checked by observing a region $Q \geq 100\mu$; and also an irregularity above $Q = 500\mu$ can be observed nearly at $Q = 500\mu$.

The above is a result of a study based on a number of experiments. Hereinbelow a simple and easy example of a method experimented will be explained.

Measurement of the total range of thickness and local minute thickness nonuniformities is done on EVOH layer following the procedures below.

(1) Take a sample, 100 to 200 mm long from a tube molded continuously, (2) Slice the sample at several spots with a sharp cutter or the like to specimens of 1 to 2 cm long, while paying attention not to cause delamination and deflection between layers of the multilayer structure, and also to minimize stress at the cut surface, (3) Flatten the cut surfaces with a plastic grinder or a sharp knife, etc. so that the clear cross sections can be observed, and (4) Observe and measure each sample with a microscope at about 40 to 300 magnification.

Though TR layer and EVOH are relatively transparent, the boundary lines can be seen from differences in refractivity and color shade to make possible measurement of relatively larger irregularities. However, measurement of minute nonuniformities of less than a few $\mu$, i.e. below a range $Q = 100$ to $200\mu$ is rather difficult and requires a high-precision observation of cross sections, or in some cases a discernment by coloration difference using a dyestuff. Also effective is a method, experimentally, of coloring each polymer beforehand to distinguish them clearly from each other for an easier observation. It happens that a sample rejected by observation of the cross section, may be an accidental defect due to contamination of foreign substances, etc., which will not cause a streak. In this case it is necessary to do rechecking by further observing residual samples to see if it is really a continuous minute nonuniformity in thickness.

The present inventors have also studied how to take out EVOH layer without damaging it from a multilayered tube, and have found an effective method to measure the thickness, thus making it possible to have the EVOH layer only be observed with the naked eye or with a special microscope as well as subjected to measurement with a thickness tester. That is, in the case where the softening point of TR layer is lower than those of PES and EVOH, the following method is effective as well as simple and easy.

(1) Heat a sliced multilayered tube in a heating furnace, etc., to a temperature below melting points of PES resin and EVOH resin, and above that of TR resin, to soften TR layer (2) Take out EVOH layer by sliding PES layer and EVOH layer in the longitudinal direction, (3) Peel off adhering TR layer by using as required, a special delamination solvent having mixed acetone, etc. to obtain spotless EVOH layer, and (4) Serve the EVOH layer for a measurement by clear observation.

FIG. 4 shows a perspective view of EVOH layer obtained from the tube. Most simply, the thus obtained EVOH layer is held to the light to allow a full observation of local minute nonuniformities C (cavity) and D (projection) of a few $\mu$ in thickness as thin streaks; and such sensory evaluatoion or comparison with naked eye can mostly judge whether the specimen is acceptable or not.

Also effective are rough measurement of thickness nonuniformities and observation of thickness nonuniformities by observing with a microscope cross section in the circumferential direction (direction perpendicular to the tube axis) of the tube.

The next important thing in the present invention is that a multilayered tube satisfy the afore-described inequalities I-①  to I-③.

I-① specifies the range of thickness of EVOH layer. Though as EVOH layer is made thinner more uniformly the layer is drawn to form less streaks, an improvement in the barrier property which should be the top object of having multilayer can not be achieved if the EVOH layer is made too thin. Further, in the case where the EVOH layer in a tube is as thin as less than 50$\mu$, it is very difficult to maintain a continuous molding for a long time of a multilayered tube having uniform EVOH layer of small thickness biases. Consequently, the thickness should be 50$\mu$ or above, preferably 150$\mu$ or above. On the other hand, as EVOH layer is made thicker, a poor drawability of EVOH becoming an issue, irregularities upon drawing will increase to make streaks highlighted as well as to worsen the cooling of the tube, which will in turn cause a whitening of the tube caused by crystallization. Therefore it is preferred that the thickness be not more than 1000$\mu$ and more preferably: $150\mu \leq \overline{E} \leq 700\mu$. From the viewpoint of gas barrier property required for bottles for general refreshing drinks in the market also, it is said that a thickness of 700$\mu$ (about 50$\mu$ after drawing) or below will be sufficient.

I-② is an allowable variation in the thickness of EVOH layer. Prevention of biased thickness of EVOH layer is very difficult because of poor flow characteristics of EVOH. However since such biased thickness directly cause nonuniformity of drawing and generation of streaks, a variety of studies have been made on how to fix acceptable limits of biased thickness. As a result therefrom, it was found that the acceptable limits of biased thickness can, in a relationship with tube diameter (H), be well specified to be: $1 - 0.01\overline{H} \leq E/\overline{E} \leq 1 + 0.01_e, ovs/H/$, more preferably: $1 - 0.008\overline{H} \leq E/\overline{E} \leq 1 + 0.008\overline{H}$.

I-③ refers to a ratio of EVOH layer to PES layers. It is, though not deemed so important a factor in a general multilayered tube, an important condition for obtaining a streakless bottle by uniformly drawing a multilayered tube containing an EVOH layer. PES layers have a important function of helping uniformly draw EVOH which is by itself of poor drawability, by co-drawing. In the case where the ratio of PES layers is small, the PES layers themselves being affected by poor drawability of EVOH layer, the whole bottle will undergo nonuniform drawing resulting in greater irregularities in thickness, which will make it difficult to eliminate streaks. For this purpose it is preferred that $\overline{E}/(\overline{A}+\overline{B})$ be 0.2 or below, more preferably 0.15 or below.

Further it is preferred the multilayered tube according to the present invention satisfy the following conditions IV-① to IV-⑬:

| | |
|---|---|
| 15 mm $\leq \overline{H} \leq$ 50 mm | IV-① |
| $0.98 \leq H/\overline{H} \leq 1.02$ | IV-② |
| $1000\mu \leq \overline{Z} \leq 7000\mu$ | IV-③ |
| $0.85 \leq Z/\overline{Z} \leq 1.15$ | IV-④ |
| $300\mu \leq \overline{A} \leq 5000\mu$ | IV-⑤ |
| $0.75 \leq A/\overline{A} \leq 1.25$ | IV-⑥ |
| $150\mu \leq \overline{B} \leq 4000\mu$ | IV-⑦ |
| $0.75 \leq B/\overline{B} \leq 1.25$ | IV-⑧ |
| $0.1 \leq \overline{B}/\overline{A} \leq 5$ | IV-⑨ |
| $10\mu \leq \overline{C} \leq 300\mu$ | IV-⑩ |
| $0.4 \leq C/\overline{C} \leq 1.5$ | IV-⑪ |
| $10\mu \leq \overline{D} \leq 300\mu$ | IV-⑫ |
| $0.4 \leq D/\overline{D} \leq 1.5$ | IV-⑬ | wherein:
H: outer diameter of tube (mm)
Z: wall thickness of tube ($\mu$)
$\overline{Z}$: average wall thickness of tube ($\mu$)
A: wall thickness of inner layer of saturated polyester ($\mu$)
$\overline{A}$: average wall thickness of inner layer of saturated polyester ($\mu$)
B: wall thickness of outer layer of saturated polyester ($\mu$)
$\overline{B}$: average wall thickness of outer layer of saturated polyester ($\mu$)
C: wall thickness of inner layer of adhesive resin ($\mu$)
$\overline{C}$: average wall thickness of inner layer of adhesive resin ($\mu$)
D: wall thickness of outer layer of adhesive resin ($\mu$)
$\overline{D}$: average wall thickness of outer layer of adhesive resin ($\mu$).

The above IV-① to IV-⑬ are preferred conditions for the multilayered tube used for draw molding according to the present invention.

IV-① specifies the size of the multilayered structure of this invention, which is preferably in a range from 15 to 50 mm from the following reasons: For a multilayered tube having an outer diameter of 15 mm or smaller, where a high-thickness molding is difficult to carry out, there are restrictions on the caliber and body diameter of the bottle from limitation in the drawing ratio of the body, and the ratio (surface area of bottle)/(volume of bottle) will increase to adversely affect the barrier effect. Therefore, preferred is 15 mm or higher. For a multilayered tube having an outer diameter of 50 mm or greater, there are several drawbacks including an inevitable enlargement of body diameter due to a minimum required drawing ratio, which requires higher pressure resistance and makes necessary a thicker wall, a restriction on bottle caliber by tube diameter, and that preparation of preforms is difficult.

IV-② specifies the deformation ratio of a tube expressed in tolerance of outer diameter of the tube. When the tolerance is too large, the following troubles will occur: at the preparation of preforms (preparation of mouth and bottom from a tube): nonuniform pressing of preforms, bad molding of bottom, disorder of mouth shape, difficulty in demounting from the mold, at blow molding: nonuniform heating to cause not only deformation and irregularity in thickness of the bottle, but also thereby an increase of streaks on the bottle, so that it is required that the tolerance of the outer diameter be ±2% or below, preferably ±1% or below.

IV-③ specifies the range of wall thickness of the tube. With a thin wall, (1000 $\mu$ or thinner) it is difficult to carry out multilayer molding on account of irregular thickness, deformation of the tube, and the like. Moreover in such a case, as pressure bottle where in general a drawing ratio of 5 to 15 times is applied, the wall thickness becomes thin and so liable to deform or damage by an external force to make the bottle unsuitable for use. On the other hand a thick wall of 7000 $\mu$ or thicker will worsen the heat transfer, and cause whitening phenomena to occur at portions of EVOH layer of PES layer due to crystallization, thus rendering it difficult to obtain a bottle having a transparent feeling. A more preferred range is $1500\mu \leq Z \leq 6000\mu$.

IV-④ specifies the tolerance of thickness of entire tube wall. When the thickness is biased to a great degree, resulting nonuniformities in drawing and heating at drawing will maintain and enlarge the bias as thick biased wall portions. These portions will cause deformation of tube, deformation of bottle, poor strength, poor barrier property, etc., which do not give a satisfying bottle. Besides, the nonuniformity in drawing will help increase streaks, and also, the biased thickness of whole wall affects the quality of preform making. Accordingly, the whole wall thickness bias should be ±15% or below, preferably ±10% or below.

IV-⑤ specifies the range of wall thickness of the inner PES layer. In the case where the wall thickness of the inner layer is 300 $\mu$ or below, not only molding of the tube becomes difficult; but since EVOH layer is placed closer to the inside of the bottle, when used as a bottle for water-related beverages such as beverages containing carbon dioxide gas, water content of EVOH becomes higher to markedly decrease the barrier property resulting in an insufficiency in the barrier property. Besides, an inward shift of EVOH layer by a thinner inner layer will worsen the external cooling effect at the time of sizing cooling of the tube, resulting in generation of problem of whitening due to crystallization. Further at the time of molding preforms, disorder of the inner layer occurs because of too thin an inner layer, thus making it difficult preparation of a good preform.

Therefore, the wall thickness of the inner PES layer is preferably 300$\mu$ or above, more preferably 500$\mu$ or above. On the other hand, a too thick wall of 5000$\mu$ or thicker will bring problems such as an increase in the solubility of carbon dioxide gas contained in a carbon dioxide gas beverage into the inner PES layer, worsening of resistance to pressure against internal pressure of the gas, which in turn causes delamination at the adhesive resin layer to occur, and so on. Therefore, the wall thickness of the inner PES layer is not more than 5000 $\mu$, more preferably not more than 4000$\mu$.

IV-⑥ specifies tolerances for the thickness of the inner PES layer. Since too high a variation causes nonuniformity in gas barrier property, and since a good balance is required for a good preforming and good blow molding, same as in cases of inequalities IV-② and IV-④, the tolerance is ±25%, preferably ±20%.

IV-⑦ specifies the range of the thickness of the outer PES layer. Though molding of a thinner outer, than inner layer is possible, still it is still difficult to mold 150$\mu$ or below. Further, too thin an outer PES layer will, in the case of a pressure bottle such as the one for carbonate beverages, produce a problem of delamination in the intermediate EVOH layer caused by stress which generates in the adhesive resin layer. On the other hand, a construction comprising a PES layer of more than 4000$\mu$ thick will, though the molding is possible, shift EVOH layer inwardly, that is, to a high-moisture side resulting in worsening of barrier effect and external cooling effect of the EVOH layer.

IV-⑧ specifies tolerances for the wall thickness of the outer PES layer to be ±25%, more preferably ±20%, settled for a good balance for achieving a good preforming and a good bottle molding, same as in IV-⑥.

IV-⑨ specifies the ratio of wall thicknesses of the inner PES layer and the outer PES layers. In other words, the ratio stands for a construction showing in which position in the tube wall the EVOH is located, and is, as explained in IV-⑤ and IV-⑦ a very important factor for tube molding technique and bottle molding technique, particularly bottle performance. In the case where EVOH layer is shifted outward, the tube and $\overline{B/A}$ is made smaller; when the tube is later processed into a gas barrier container for water-related beverages such as carbonated drinks, decrease in barrier property will be avoided to some extrent. However since the inside gas pressure applied to the EVOH layer is also acted upon the thin outer PES layer, a delaminating stress in TR layer acting between the inner and outer layers of PES becomes large to readily generate delamination between the EVOH layer and TR layer. On the other hand, in the case where EVOH layer is shifted inward and $\overline{B/A}$ is made larger, though it is preferred from viewpoint of delamination, EVOH layer is located closer to the contained liquid, i.e. to high-moisture area, to make the barrier property decrease. Accordingly it is necessary to determine the most adequate construction taking into consideration the kind of content to be filled and the required performances such as pressure resistance, gas barrier property, etc. Generally speaking, for the gas barrier containers while it is unavoidable that the barrier property decrease due to moisture, the delamination problem can be solved by selecting bond strength of TR. Therefore it is recommended that the EVOH layer be shifted outward a little from the intermediate layer. Besides, when the wall thickness ratio $\overline{B/A}$ of the inner and outer PES layers is too high or too low, there readily forms a bias or nonuniformity in thickness of the thin PES layer, there becomes greater local nonuniformities in thickness of the EVOH layer which will cause streaks, and there readily generates a disorder (disorder in a thinner PES layer) of mouth at preform molding and that of bottom (e.g. bad junction due to disorder in a thinner PES layer), and so on. Accordingly the construction ratio is preferably $0.1 \leq \overline{B}/\overline{A} \leq 5$, more preferably $0.25 \leq \overline{B}/\overline{A} \leq 2.5$.

IV-⑩ to IV-⑬ are conditions of accuracy of wall thickness and thickness bias of TR layer. TR is a layer bonding PES layers with EVOH layer and has a particularly important meaning in preparing a biaxially drawn container from a multilayered tube. The TR layer must satisfy the following conditions:

(i) In molding a tube, delamination of tube should be prevented by relaxing stress such as heat shrinkage caused by a difference in cooling degree between PES layers.

(ii) In the preparation of preforms, delamination of tube caused by an external force generating on tube cutting, and others should be prevented.

(iii) When preparing preforms, nothing unusual such as unusual melting or bad fusion at the time of heating mouth and bottom of the bottle, may be allowed to happen.

(iv) At blow molding; a shear between PES layer and EVOH layer should be minimized so that the EVOH layer can be co-drawn uniformly with PES layer, and at the blow molding temperature, viscosity or Young's modulus should be kept high not to cause a delamination.

(v) No delamination should occur due to deformation of the bottle caused by internal pressure, by external force, etc.

(vi) The obtained bottle should satisfy other conditions in use (temperature, dropping, etc.)

For the purpose of obtaining a streakless bottle, the condition (iv), that is, TR being capable of allowing EVOH layer to be uniformly drawn is the most important. Therefore, an adhesive resin layer is not simply the one to be interposed between PES layer and EVOH layer, but is specified to satisfy the above conditions. Thus the thickness of the inner and outer layers, $\overline{C}$ and $\overline{D}$ are each $10\mu$ to $300\mu$, preferably $30\mu$ to $100\mu$. In the case where the thicknesses of the TR layers in the tube, $\overline{C}$ and $\overline{D}$ are less than $10\mu$, there tends to happen delamination from the EVOH layer caused by a difference in shrinkage stress on cooling in the tube molding process or by external stress on tube cutting, as well as by deformation stress due to internal gas pressure of the bottle. On the other hand, in the case where the thickness exceeds $300\mu$, in the course of blow molding, the bond between PES Layer and EVOH layer loosens, which lowers gripping effect to bring about a shear resulting in incapability of eliminating a nonuniformity in drawing the EVOH layer which is of poor drawability, so that streaks will readily be formed. Besides, a thickness more than required of TR layer is meaningless and will lead to a costup, which is not preferred. The thickness is most preferably $30\mu$ to $100\mu$. The thickness biases of TR layer $C/\overline{C}$ and $D/\overline{D}$ are preferably 0.4 to 1.5, more preferably 0.7 to 1.3. When $C/\overline{C}$ or $D/\overline{D}$ is lower than 0.4 or higher than 1.5, drawing will be nonuniform to cause delamination of thin portions or streaks due to uneven drawing to generate readily. The closer to 1 $C/\overline{D}$ and $D/\overline{D}$ are, the less nonuniform drawing can be achieved to prevent streaks.

The average wall thickness and the average outer diameter of each layer in I-① to I-③ and IV-① to IV-⑬ are the average values at the cross section (circumpherential direction of tube) of a multilayered tube cut roughly perpendicular to the longitudinal direction at two points 1 to 2 cm longitudinally distant from each other, and are calculated from areas determined by integration method. The wall thickness and the outer diameter of tube are any wall thickness and any outer diameter at the above two sections.

Description will be made hereinbelow on a method of manufacturing the multilayered tube of this invention, which comprises PES layers as the inner and outer layers, an EVOH layer as an intermediate layer and TR layers interposed between the PES layers and the EVOH layer.

In this manufacturing method, an important condition is to keep within a specified range the relationship between viscosities of molten polymer of each resin in the die of coextrusion equipment. Since the proper temperature for molding each single resin varies greatly from one another, it is not enough to conventionally grasp the resin viscosity at a proper molding temperature, bhut it is required to grasp the viscosities having considered a temperature change inside the die.

The present inventors have found it best to specify viscosities at 5° C. above the melting point of PES resin having a melting point highest among PES, EVOH and TR, that is, to specify a viscosity index of any of polymers of PES resin, EVOH resin and TR resin at a temperature close to the melting point of PES (melting point of PES +5° C.).

More precisely, it has been found that it is important to select a range of melt index (MI) value measured at the melting point of PES {MP(PES)} +5° C. of each polymer (MFR determined by method A of JIS-K-7210 GENERAL TEST METHOD BY FLOWING WATER, load 2160 g), and ratios of MI's of each two of the polymers such that they will satisfy the following III-① to III-⑥.

| | |
|---|---|
| 0.3 g/10 min.$\leq$MI(PES)$\leq$10 g/10 min. | III-① |
| 1.0 g/10 min.$\leq$MI(EVOH)$\leq$25 g/10 min. | III-② |
| 1.5 g/10 min.$\leq$MI(TR)$\leq$90 g/10 min. | III-③ |
| 0.2$\leq$MI(EVOH)/MI(PES)$\leq$30 | III-④ |
| 0.5$\leq$MI(TR)/MI(PES)$\leq$60 | III-⑤ |
| 0.2$\leq$MI(TR)/MI(EVOH)$\leq$25 | III-⑥ |

PES is a principal resin constituting most part of a tube, and so it is not preferred, from viewpoint of practicality, to select taking into consideration only compatibility of viscosity factor with EVOH or TR, or that of temperature factor. Since tube formability and bottle moldability are of great importance for obtaining a good tube and a good bottle including quality items such as strength and transparency, the manufacturing conditions for PES tend to shift toward higher viscosities, higher melting points and lower modification degree, which are also influenced by productivity and production cost, thus making it technically difficult to have a proper formation temperature and a proper viscosity match those of EVOH and TR. Further, because EVOH is a resin very sensitive to heat and being liable to gel or deteriorate by thermal decomposition, it is necessary to lower the temperature of PES to the lowest at which the molding is still possible. Generally it is preferred to carry out extrusion molding while decreasing the temperature close to MP(PES).

PES used preferably in this invention is the one which satisfies the condition III-①. The prreferred range is 0.7 g/10 min≦MI(PES)≦10 g/10 min. [η] of PES is 0.7 to 1.4, preferably 0.8 to 1.3. In the case where MI(PES) (at MP +5° C.) exceeds 10 g/10 min, that is, when the melt viscosity is too low, on the occasion of coextrusion molding with EVOH tubular molten polymers having a multilayered construction extruded from a die will deform, in a passage starting at the exit of the die reaching to a cooling fixing zone, giving a serious deformation or a thickness bias causing a difficulty in obtaining a uniform multilayered tube. On the other hand, in the case where MI(PES) is lower than 0.3 g/10 min., though the above-described deformation in the passage from the extrusion to the cooling fixing zone hardly generates, there will occur a poor flowability to make difficult a high speed molding and besides, such a high-viscosity polyester requires for the production thereof special melt polymerization conditons or a long-time solid phase polymerization and is difficult to industrially manufacture at a low cost.

Viscosity of EVOH is also very important. For the purpose of preparing a clean layer having a minimum thickness bias and no minute thickness nonuniformities which will cause streaks in the bottle, it is specified that the proper range of viscosity coefficient be: MI(EVOH)≦25 g/10 min, more preferably MI(EVOH)≦20 g/10 min. In the case where MI is higher than 25 g/10 min; even in case the coefficient of melt viscosity of PES is in the above-described proper range, EVOH layer constituting an intermediate layer of the tube obtained by coextrusion molding of the two resins forms a number of streaky nonuniformities in thickness, so that a container prepared from the tube will have a very poor appearance and in utmost cases its properties such as the gas barrier property and resistance to shock will sometimes be unsatisfactory.

On the other hand, a high polymerization-degree EVOH having a MI(EVOH) lower than 1.0 g/10 min has the following drawbacks:

difficult to extrude on account of a poor melt-extrusion capability,
poor in moldability caused by high tendency to gel and decompose by deterioration because of the polymer being subjected to a high temperature,
difficult to coextrude with PES, and
requires special polymerization conditions for the production of the high polymerization degree EVOH, where there are limitations in equipment and production efficiency, thus not being industrially obtainable at a low cost.

Therefore MI(EVOH) is preferably 1.0 to 25 g/10 min, more preferably 2 to 20 g/10 min.

TR layer interposed between PES layer and EVOH layer has a function of adhering the EVOH layer to the PES layer and making effective co-drawing of PES/EVOH on blowing. The layer is preferably thinner, and the coefficient of viscosity can be selected from a wide range. Thus good molding is achieved when MI(TR) is 1.5 to 90 g/10 min at MP(PES)+5° C. However if MI(TR) exceeds 90, the viscosity becomes very low to make difficult formation of the polymer flow as a uniform thin layer inside the die; and further in this case if the difference of viscosity between PES layer and EVOH layer is big, there readily occurs an unbalance of flow in the formation of multilayer laminar flow, generating pulsations or nonuniformities in flow and also local minute surface irregularities and biased thickness. On the other hand if MI(TR) is less than 1.5, though the moldability of the resin itself becomes better and so there will be no problem unless the viscosity of EVOH is very low, the TR polymer having invaded into the flow pass of EVOH layer, which happens for instance at the time of starting the molding, will not easily be substituted with EVOH and tends to remain there to cause a disordered flow of the EVOH layer. Therefore, MI(TR) is preferably 1.5 to 90 g/10 min, more preferably 2 to 75 g/10 min. As requirements for TR resin, while viscosity is important for a good multilayer flow of polymers, most important are adhesiveness with PES and EVOH, and co-drawability in blowing, as well as physicochemical properties including heat resistance, water resistance, appearance (transparency, etc.), and so on, so that there can rarely be found a preferably applicable resin from among conventional resins.

III-④ to III-⑥ specify the applicable ranges of coefficient of viscosity of each resin. Concerning the ratio of viscosity coefficients of EVOH/PES, MI(EVOH)/MI(PES), though it is likely thought that because the two resins do not touch directly the ratio has no relationship with moldability, in practice it is not the case. Since TR layer is a very thin layer, and the flow of PES sensitively influences EVOH layer, the ratio MI(EVOH)/MI(PES) is important particularly when the ratio is high. In this case an irregularity in polymer flow of the high-viscosity side (PES) strongly affects flow of ;the low-viscosity flow (EVOH), destroys the balance of laminar flow, and readily makes form disorders such as irregularities of thickness or thickness bias caused by pulsation at interfaces of the laminate, so that there can not be obtained a multilayered tube having no thickness bias and minute nonuniformities in thickness. Tendency to deform is more distinguished as the thickness becomes large. Thus the rather thick PES layer allows a selection of viscosity toward higher side, while the thinner TR layer can choose a viscosity of a little lower side. From the above reasons, it is preferred that conditions III-④ to III-⑥ be satisfied, and more preferably:

$$0.5 \leq MI(EVOH)/MI(PES) \leq 20$$

$$0.5 \leq MI(TR)/MI(PES) \leq 40$$

$$0.5 \leq MI(TR)/MI(EVOH) \leq 25$$

Melt index (MI) used in this invention means a melt viscosity index of PES, EVOH or TR in a tube, and is defined as follows according to JIS-K-7210.

$$\text{Melt viscosity index } (T,M) = \frac{600 \times m}{t} \text{ (unit: g/10 min)}$$

wherein:
T: temperature measured {MP(PES)+5° C.}
M: load (2160 g, constant)
m: weight of polymer extruded (g)
t: period of polymer extrusion (sec)

It is necessary that moisture contents of specimens for measuring melt viscosity index be reduced to 20 ppm or below for PES, 50 ppm or below for TR and 500 ppm or below for EVOH respectively by draying in vacuum or with hot air prior to the measurement.

PES used in this invention is representatively a polyethylene terephthalate-related polyester. As the polyester, there is a polyester resin being principally composed of a glycol component and an acid component, containing terephthalic acid in an amount not less than 80 mol%, preferably not less than 90 mol%, of total acid component, and ethylene glycol in an amount niot less than 70 mol%, preferably not less than 90 mol% of total glycol component. Examples of other acid components include isophthalic acid, phthalic acid, naphthalene-1,4- or 2,6-dicarboxylic acid, diphenylether-4,4'-dicarboxylic acid, aromaticdicarboxylic acids such as diphenyldicarboxylic acid and diphenoxyethanedicarboxylic acid, aliphatic dicarboxylic acids such as adipic acid, sebacic acid azelaic acid and decan-1,10-dicarboxylic acid, alicyclic dicarboxylic acids such as cyclohexanedicarboxylic acid, etc. These are used alone or in mixtures of more than two, being mixed with terephthalic acid in an amount not exceeding 20 mol% of the total acid component. Examples of other glycol components are aliphatic glycols such as propylene glycol, trimethylene glycol, tetramethylene glycol, diethylene glycol, polyethylene glycol, polypropylene glycol, polytetramethylene glycol, hexamethylene glycol, dodecamethylene glycol and neopentyl glycol, alicyclic glycols such as cyclohexyl glycol and aromatic glycols such as 2,2-bis(4-$\beta$-hydroxyethoxyphenyl)propane. These glycols may be contained in an amount not exceeding 20 mol% of the total glycol component. Composition of the inner PES layer and that of the outer PES layer may be the same or different from each other.

In this invention, in the case where the ethylene content of EVOH as the intermediate layer exceeds 55 mol%, the gas barrier property which is an excellent charcteristic of the resin, becomes poor; while the content of less than 20 mol% will make poor molding processability and can not be used in this invention. Accordingly the ethylene content of EVOH is preferably 20 to 55 mol%, more preferably 25 to 50 mol%. The saponification degree of vinyl acetate component is preferably 96 mol% or higher, and that of less than 96 mol% decreases the gas barrier property and can not be put in practical use. In the preparation of EVOH, a monomer other than but copolymerizable with ethylene and vinyl acetate may be used for copolymerization followed by saponification, within a limit not to impair the intention of the present invention.

As TR which is interposed between the inner and outer PES layers and the intermediate EVOH layer according to this invention, preferred examples include ethylene-vinyl acetate copolymer grafted with an unsaturated carboxylic acid or anhydride thereof, polyolefin grafted with an unsaturated carboxylic acid or anhydride thereof, ethylene-acrylic acid ester (e.g. ethyl acrylate) grafted with an unsaturated carboxylic acid or anhydride thereof, polyester having bonded wherewith aluminum atom and a monocarboxylic acid as described in U.S. Pat. No. 4,496,714 (JPA No. 115327/84), and so on.

The inner and outer layers of the multilayered tube according to this invention may, as occasions demand, be further provided thereon another resin layers and the like; but it is preferred that PES layers be the utmost layers from viewpoint of mechanical strength and appearance. Further each layer of the multilayered tube may as required incorporate pigments, dyestuffs, antioxidants, ultraviolet stabilizers, fillers, etc.

Above have been explanations on important manufacturing conditions for one of the multilayered tubes according to the present invention. Hereinbelow explanations will be made on important conditions of other manufacturing factors, with reference to a representative example.

The preent inventors have found as a result of a number of molding tests of multilayered tubes that the important points in the manufacturing technique
 (i) selection of a resin
 (ii) extrusion conditions of the resin
 (iii) structure of die and operating conditions
 (iv) starting up conditions of molding Selections of resins is very important as regards molding technique of a multilayered tube. Particularly, viscosities of resins used and compatibility thereof (ratio of coefficient of viscosity) are important as described heretofore. However, for obtained a good tube, besides the requirements of product qualities and the viscosity and the compatibility thereof, very important are conditions in the manufacturing technique, which will be elucidated hereinbelow based on the study made by the present inventors.

First of all, an important question is selection of resins; below are the points to be observed in selecting each resin.

SELECTION OF TR RESIN

Already explained are that the fundamentals of TR resin are adhesiveness in a multilayered tube and bottle, and compatibility of viscosity with those of other resins at the time of coextrusion molding, and drawability in blow molding coming next. Selection of TR has so far been made centering simply on adhesiveness. However for obtaining a good bottle having no streaks, it is also an indispensable matter for TR, while being incorporated between PES layer and EVOH layer, to harmonize with the moldabilities of both PES and EVOH which are largely different from each other, which is so one of the points for selection of TR.

TR is required to meet, while being incorporated between PES layer and EVOH layer in the passage inside the die, the following requirements:
 ① capable of suppressing heat transfer from high-temperature PES to EVOH and thereby suppress overheating of EVOH, and
 ② capable of preventing delamination at the cutting process of tubes and at preforming, by suppressing residual internal stress due to a difference of heat shrinkages at the sizing and cooling process between PES and EVOH and relaxing the residual internal stress.

More concretely, important are melting point, crystallinity, proper temperature for molding, elastic modulus and so on of TR, the points of which are summarized as follows:

(1) Melting point of TR should be much lower than the molding temperature of PES, and be as close to the melting point of EVOH. The preferred range is expressed as follows:

$$80° C. \leq MP(TR) \leq MP(EVOH) + 20° C. \qquad III-⑦$$

$$MP(TR) \leq MP(PES) - 20° C. \qquad III-⑧$$

wherein melting point (MP) means a temperature of melting of crystal determined using a differential scanning calorimeter (DSC) at a temperature raising rate of 20° C./min.

(2) The resin should not, when contacted with a high temperature (molten PES), form deterioration or unusualness such as foaming and gelation and coloring, and should have a wide applicable range of molding temperature.

(3) Melting point of TR should be higher than glass transition temperatures of PES and EVOH, and at the same time higher than the blow temperature of bottle, that is, should be 80° C.≦MP(TR), more preferably 90° C.≦MP(TR).

(4) The resin should be of lower elasticity than PES and EVOH. While the elastic moduli of PES and EVOH are generally 12,000 to 32,000 kg/cm², that of TR should be 6000 kg/cm² or below, preferably:

$$200 \text{ kg/cm}^2 \leqq E(TR) \leqq 6000 \text{ kg/cm}^2 \qquad \text{III-⑨}$$

more preferably 300 kg/cm²≦E(TR)≦5000 kg/cm² wherein E(TR) means an elastic modulus at a room temperature (0° to 45° C.).

(5) The resin should be of a low crystallinity at molding temperature range (particularly at 75° to 130° C. which range is for parison molding and blow molding) may not form whitening due to crystallization.

SELECTION OF EVOH RESIN

EVOH is a resin having a great tendency to deteriorate by heat, and also having a technical difficulty in molding even thereof only; and it has, regarding formation of the multilayered tube of this invention where the coextrusion with a high-temperature PES is necessary, still more difficulties so that the selection of the resin is very important. In selecting EVOH, while it has already been explained that the relationships of polymer viscosity at molding with PES and TR are the most important, considerations listed below are also important because of special characteristics of EVOH.

(1) EVOH is a resin of a very poor extrusion moldability, and has an annoying characteristic of readily forming heat deterioration and gelation when subjected to a high temperature extrusion at high shear for the purpose of fully melting, since there readily incorporate unmolten matters in extruded polymer. Therefore the resin should be of uniform composition containing no abnormally polymerized compounds, no unevenness in crystallinity, etc.

(2) EVOH is a resin having a particular tendency to deteriorate by heat. Therefore employment of a high precision filter which will cause minute stagnation of the polymer should be avoided. To this end, little or no contamination of foreign matters or gels may be allowed therein.

(3) Though PES and other resins are used after drying to a low moisture content of about 50 ppm or below, such a high degree of drying of EVOH will cause a problem such as deterioration or degradation. Therefore moisture content of EVOH should be kept high, which will make better extrusion moldability, with a range not to cause deterioration by hydrolysis. The moisture content should be 500 to 2000 ppm, preferably 800 to 1800 ppm.

SELECTION OF PES RESIN (1) For the selection of PES, the most important factors is fundamentally, as already explained, characteristics for molding tube represented by polymerization degree and viscosity.

(2) Though pure PET is most preferable from the viewpoints of economy and bottle properties, there is also often employed, considering factors of molding viscosities of EVOH, etc. and of whitening due to crystallization in a tube having a thicker wall, a polyester having shifted to a lower temperature moldability and to a lower crystallinity by modification with cyclohexanedimethanol, etc. in an amount of about 2 to about 15 mol%. Generally, for a thin wall tube having a wall thickness of 3 to 4 mm or below, pure PET or a PES closer thereto, modified slightly in an amount of 2 to 3 mol% is preferred; while for a thicker tube having a wall thickness of not less than 3.5 to 4 mm, a PES modified in an amount more than 2 to 3 mol%.

Next, points in the extrusion conditions with these resins will be explained.

EXTRUSION CONDITIONS FOR PES

PES (particularly pure PET) of a high polymerization for tube molding tends to decrease its tube moldability if extrusion-kneading is insufficient. Therefore extrusion-kneading is promoted by raising extrusion temperature and increasing screw rotation. Thereupon due to self heating, the temperature raises to a considerably high temperature to make, if the high temperature PES in a large amount extruded is introduced as it is, the whole die be highly heated causing problems of PES itself such as viscosity decrease and generation of decomposed matters, as well as deterioration of TR and EVOH inside the die.

For avoiding above, it is preferred to cool to a proper temperature by employing a method comprising using an extruder of high kneading and low heat generation type as shown in FIG. 5, which is provided with a feed zone, a compression zone and a metering zone, and cooling at the exit side of the metering zone or cooling with a thermogenizer (static mixer for cooling) mounted on the polymer pass 2-A, and so on. Here, too rapid cooling will cause a local supercooling to promote local crystallization of PES resulting in generation of a whitening problem. Further, when at 1-A of the extruder for PES there occur variations in amounts extruded, in temperature and in pressure, there will generate not only a variation in tube weight or in multilaminar polymer flow inside the die, but also a great variation of the sizing state which has been minutely adjusted, to create big problems of worsened tube surface, nonuniformities of tube thickness and so on. To stabilize the sizing, it is preferred that the variation of amount extruded be ±2.5% or below, preferably ±1% or below, variation of polymer temperature be ±5° C. or below, preferably ±3° C. or below, and the pressure variation be ±4% or below, preferably ±2% or below.

EXTRUSION CONDITIONS FOR EVOH

Since EVOH readily deteriorates by heat, which will cause, at places of stagnation or of a slow flow in the polymer pass, generation of abnormalities such as gels, foaming, coloring by degradation, etc., which will in turn mix into EVOH polymer to give streaks or "grains" (granular matters having mixed thereinto abnormal substances such as gels). Particularly, degraded matters having deposited at the pass confluence inside the die are the principal cause for generating streaks. For preventing the heat deterioration of EVOH, it comes at first to decrease the temperature of the polymer extruded. However, since EVOH having a high viscosity or high barrier property (having a low ethylene content) is used for mutilayered tubes, a decrease in the extrusion temperature will decrease meltability in the extruder and readily form local nonmolten matters due to insufficient kneading. The unmolten polymer will then mix into polymer flow to give granular defects or remain at deflected parts or at parts of low flow rate in the passage to grow into gel-like grains which again mix into the polymer to give granular defects. Sometimes they lie attached onto the wall of the pass in the die to roughen the surface thereof to cause generation of streaks. Thus there can not be obtained a good result by simply lowering the extrusion temperature.

Explained hereinbelow will be results of various studies performed by the present inventors for getting a good EVOH layer, with reference to an example of effective and important extrusion conditions.

① The screw of the extruder 1-B shown in FIG. 5 is required to be of high kneading capacity, allow no stagnation and cause only a little heat generation. Preferred screw is a single axis full flight screw having a large L/D (not less than 22, preferably not less than 26).

② The rate of shear of EVOH at the metering zone of the extruder 1-B (consisting of a feed zone, compression zone and a metering zone) is adjusted to: $\dot{\gamma} = 20$ sec$^{-1}$ or higher, preferably $\dot{\gamma} = 30$ sec$^{-1}$ or higher.

③ The entire passage from the extruder 1-B to the die 3 shall be constructed in such a way that it will have no stagnation region and it is preferred that the inner wall surface be smooth, preferably finished by hard chromium plating and the like so that any deposit can hardly form.

④ Average flow rate of the polymer in the die 3 is preferably 0.2 cm/sec or higher, and the rate of shear therein is preferably 4 sec$^{-1}$.

⑤ It is also an effective method to provide the polymer passage 2-B with a static mixer having no stagnation region as the thermogenizer for cooling, with which the cooling of the polymer will be controlled.

EXTRUSION CONDITIONS FOR TR

As regards the extrusion of TR, that a polymer extrusion without forming irregular matters is important is same as in the case of PES and EVOH, for which it is required to select appropriate extrusion conditions meeting the TR to be used. Particularly important are setting of an extrusion temperature as well as balance of the extrusion temperature and the die temperature. In the case where the TR temperature is too low as compared with that of the die temperature or of PES, the TR will flow incorporating a big nonuniformity of temperature, especially at the spiral mandrel, to cause nonuniform thicknesses and streaks. On the other hand, too high a TR temperature relative to the extrusion temperature of EVOH will heighten the EVOH temperature and decrease the effect of preventing EVOH from a high temperature PES, resulting in superheating of EVOH, which accelerates deterioration of the EVOH and increases the cause of streaks and nonuniform wall thickness. Therefore, the extrusion temperature of TR shall be selected, while allowing to some extent a deviation from the most appropriate molding temperature for TR itself, taking into consideration temperature balances with EVOH and PES. For example when PES having a melting point of 230° to 255° C., the standard temperature conditions are 255° to 285° C. for PES at the die entrance (265° to 300° C. at the highest temperature region of the extruder), 220° to 260° C. for EVOH at the die entrance, and 230° to 260° C. as the set temperature for the die mold. Thereupon, when the melting point of TR is 115° C., though the appropriate temperature range for molding TR by itself is about 140° to about 180° C., the temperature of the die entrance is preferably set at 190° to 250° C. for obtaining a good tube.

Next, the manufacturing process of the multilayered tube of this invention will be illustrated referring to a simple flow sheet. FIG. 5 is an example of a representative flow sheet of molding process for a PES/TR/EVOH 3 kind/5 layer tube manufacturing apparatus. 1-A, 1-B and 1-C are extruders each of which is provided with a feed zone, compression zone and a metering zone, for PES, EVOH and TR respectively. 2-A, 2-B and 2-C are passages of the three polymers, each of which is as occasions demand provided with a filter, a gear pump, a thermogenizer (static mixer), a purging valve, a temperature measuring device, an instrument for measuring extrusion pressure, a heating and heat-insulation system, a cooling device, and so on. The die indicated by 3 is selected from many types, among which known are JPA No. 5750/1981, JPA No. 147306/1985, etc., and the appropriate die conditions relative to the present invention will be elucidated later. 4 designates a tubular multilayered structure in the course leaving the die 3 and entering the sizing apparatus 5. 5 designates a vacuum sizing apparatus of external cooling type, and 6 a tank for cooling water under atmospheric pressure. 7 is a take-up device of a representative top-and-bottom belts type for taking up the cooled and solidified tube and supplying it to a tube cutter 8. 8 designates a tube cutter which is a continuous tube cutter for cutting the running tube into short segments each corresponding to a bottle or into a little longer segments corresponding to a plurality of bottles.

Hereinbelow explanations will be made on the dies for molding a multilayered tube (hereinafter referred to as simply "die") which is the most important device in the preparation of a multilayered tube, and on the operating conditions thereof. Known dies are as disclosed in Japanese patent application Nos. 5750/1981, 147306/1985, etc. Similar dies are also known as disclosed in Japanese patent application Nos. 45369/1979, 102052/1976, 45163/1974, 127310/1986 and 212919/1983, Japanese Patent Publication No. 29215/1983, and so on.

FIG. 6 shows an example of a die flow passage structure. FIG. 6-(1) is an illustrative cross sectional view in the axial direction of the die. FIG. 6-(2) is a sketch of the appearance of mandrel 23 constituting the die. 1 designates flow entrance of the inner PES layer, 2 that of the inner TR layer, 3 that of EVOH, 4 that of the outer TR and 5 that of the outer PES. 6 is the entrance of PES, 7 the branch point of PES flow, 8 the entrance of TR, 9 the branch point of TR and 10 the entrance of EVOH. PES supplied to the entrance of the inner and outer PES layers 1 and 5 goes through spiral passages of mandrels 21 and 25 for the inner and the outer PES layers respectively, while being circumferentially uniformly distributed, to discharge slits 11 and 15 and finally to the confluence 16. Similarly, TR supplied to the TR entrances 2 and 4 go through spiral passages of mandrels 22 and 24 for TR, while being circumferentially uniformly distributed, to discharge slits 12 and 14 and finally to the confluence 16. EVOH goes in a similar manner starting at the entrance 3. At the confluence 16 the 3 kind/5 layer tubular multilayered polymer flow is formed, then proceeds to the die discharging slit 17, and extruded from the die to the sizing apparatus. 18 is a vent for flowing air therein to control the pressure inside the tube. 19 is a die cover, and 20 the material of the die flow passage.

FIG. 6(2) shows a sketch of the appearance of a mandrel for EVOH. EVOH polymer supplied to the entrance of the EVOH layer is circumferentially uniformly distributed by current evening function along a spiral groove 3', and introduced to the EVOH discharge slit 13. The entrance passage 3 consists of a plurality, which number depends on the diameter of the mandrel, of gates distributed evenly on a circumference so that the uniformly distributed current evening will be attained. In preparing a good tube using the above-described mandrel having a spiral passage, it is important to make polymer flows have almost no stagnation at passages of each mandrel (particularly in spiral passages) and distribute circumferentially uniformly. Particularly for EVOH passage, presence of not only stagnation region but also that of a region of slow flow are not preferred. Average flow rate for EVOH is preferably 0.2 cm/sec or higher. Also important is the smoothness of passages. For the EVOH passage, it is preferred to provide a plating with hard chrome, which is a metal having little tendency to deteriorate and having resin deposit to form when contacted closely with EVOH, having specular gloss with a surface roughness of 0.5 S or below, more preferably 0.1 S or below.

The most important parts for achieving a good molding with no streaks, among part of the total system are the discharge slits 11, 12, 13, 14 and 15 of each polymer leading to the confluence 16. Preferred discharge slits must be smooth without flaws and having a slit gauge as narrow as possible to prevent depositing of deteriorated matters which will cause streaks, by discharging uniformly and by increasing the rate of shear at the discharge. However, too narrow a slit will increase the extrusion pressure and also increase a variation of slit gauge which greatly affects thickness bias, as well as is restricted from machining precision and assembling precision. Generally the slit gauges are preferably 0.5 to 5 mm for PES, 0.2 to 1.2 mm for EVOH and 0.2 to 1.2 mm for TR, more preferably 0.8 to 3.0 mm for PES, 0.3 to 1.0 mm for EVOH and 0.3 to 1.0 mm for TR.

The adjustment of the slit gauge of the die is also very important, and so done fully to the gauge variation of less than about ±3%, and for the EVOH slit to a difference between maximum and minimum of less than about ±20$\mu$, more preferably ±10$\mu$ or below. It is preferred to have a die structure being capable of performing minute adjustments of the gauge of the discharge slit in the course of operation also, since there will form delicate thickness nonuniformities depending on the conditions of mandrel passage or of sizing. Here an effective method is to carry out minute adjustments with an adjusting bolt by making use of bending property of the mandrel while watching thickness variations. The gauge of a discharge slit shall be designated taking shear rate of the polymer as an important index, which is particularly important for the EVOH slit since the precipitation of deteriorated matters at the slit will greatly influence formation of streaks. Particularly preferred shear rate is $\dot{\gamma} = 30$ sec$^{-1}$ or higher.

As explained above, the die is a very important process or device which introduces each polymer melted at each extruder, distributes the polymer into a tubular polymer flow and then unite the flows to form into a tubular multilayered polymer flow.

The present inventors have prepared, and made a series of tests on, dies having various forms and structures. As the result, it has been found that a die having a spiral mandrel structure an example of which is shown in FIG. 6-(2) is most appropriate, and that it is very important, particularly for a passage for EVOH, to make the mandrel structure have a smooth passage so that no stagnation will occur and as smooth a flow as possible will be achieved therein. It is also important to have an average flow rate at each part on the mandrel of 0.2 cm/sec or higher, preferably 0.3 cm/sec or higher for the purpose of suppressing formation of streaks over a long period of time. The rate of shear at the exit of the discharge slit where EVOH layer meets TR layer and PES layer is made more than 30 sec$^{-1}$, preferably more than 50 sec$^{-1}$. This is necessary based on the following fact: even in a smooth passage which does not form stagnation, when the rate of shear is low, an increase in the viscosity of EVOH at a region of slow flow will occur due to thermal degradation of the EVOH to make the flow rate slower to promote gelation, resulting in depositing of degraded matters on around the discharge slit, which will grow gradually to deform the passage surface and thereby form minute nonuniformities of thickness by nonuniformity of the polymer flow, to cause streaks to generate. Therefore, the rate of shear on the passage surface for EVOH must be made high to prevent formation of streaks. Further in the extrusion molding of EVOH, when a deformation of roughness caused by gelation once forms, it is almost impossible to resume the original good condition by employment of a purging agent or by adjustment of running conditions, but it requires a full cleaning of, after a complete disassembling, all the passages from the extruder to the die, and thereafter to start again.

Not many dies having a spiral mandrel structure described above for use in 3 kind/5 layer coextrusion molding are known, but there are known dies of a type which will make each layer meet one by one to form a multilayered structure, as disclosed in Japanese patent application Nos. 5750/1981 and 147306/1985. The present inventors have made an intensive study on dies having a spiral mandrel structure and prepared trially 4 kinds of dies having confluence structures shown diagrammatically in FIG. 7 to study moldability. Designating numbers 1 to 5 are alloted corresponding to FIG. 6. FIG. 7(1) is a flow diagram showing flow and confluence system of a die disclosed in Japanese patent application No. 147306/1985 and having a one-by-one meeting system shown in FIG. 6. FIG. 7(2) is a die which first has TR and PES of the outer layers and inner layers meet and laminate with each other, and finally have the laminate meet EVOH. FIG. 7(3) is a die of simultaneous confluence system which has 5 layers meet at the same time. FIG. 7(4) is a die which first has EVOH and TR meet and thereafter has PES meet thereonto from the both sides. Die structures are fundamentally broken down from the standpoint of confluence system into the above four systems. As dies to be used in the present invention, any confluence system can perform streak-less molding provided that the structure of passages (particularly of discharge slits and of confluence regions) be appropriate and also conditions for polymers and of operation (particularly, of starting up) be appropriate. When the total difference in viscosity and temperature is great or under such difficult conditions as high speed molding with high output, dies having confluence structures of (3) and (4) can perform molding operation more stably than those having structures (1) and (2).

Next, explanation will be given on how to conduct operation at the start up of extrusion molding of tube, which is a very important technique for preparing a good bottle having no streaks, including also the properties and conditions of polymers and the die structure.

As a result of a study on the manufacturing technique of the tube according to this invention, it has been found that the start-up method of extrusion molding greatly affects generation of streaks, which will hereinbelow be explained with reference to typical examples. Generally it is said that, in the case of molding a conventional multilayered sheet or tube, extrusions for each polymer are started voluntarily, and each polymer is introduced at will into the die followed by purging for a relatively long time at an increased discharging rate until molding becomes stable. In the coextrusion molding of the multilayered tube utilizing a high temperature PES and EVOH according to this invention, when EVOH invades into other passage or when PES of high temperature and high viscosity mixes into the EVOH passage, there will occur a viscosity increase and deterioration of stagnated EVOH because of its characteristics of readily deteriorating by heat, which causes EVOH to remain and deposit in the passage resulting in generation of streaks or gel-like grains. It is not expected that such trouble can be improved by discharging and substitution of deteriorated matters by a conventional method of increasing extrusion rate or by purging with discharging for a long time. That is, in the case where due to an improper method of starting up the extrusion molding, a roughness of the flow passage surface (minute deflection caused by deposit of degraded matters) is formed in the initial EVOH passage, such once worsened passage surface cannot be restored to the original state and it is very difficult to restore streaks of the EVOH layer to a better condition, even when improvement of the flow or cleaning of the passage surface is aimed at by changing conditions of extruding the polymer of by employment of a purging and substituting resin.

Therefore, for solving a problem of streaks, the starting up method for extrusion molding operation, i.e. the state of polymer being introduced into the inside of the die is very important, and particularly behavior of EVOH inside the die is the most important. As a result of a variety of studies made by the present inventors on manufacturing techniques for getting a tube having no streaks, there have been found effective methods for starting up a good coextrusion operation, as described below. First will be explained an example of the starting, in which order and timing of introducing polymers into the die is precisely controlled. As regards the order of introducing polymers, firstly TR is discharged to the confluence region to wet the PES slit, etc. at the confluence region, then introduce and discharge EVOH from the slit, followed by extruding PES. FIG. 13 is a diagrammatical drawing showing flows and a timing of discharge of the polymers at the die for molding the tube of the present invention. The flow passages are those of the die shown in FIG. 6-(1). In FIG. 13(1), TR is first supplied from the entrances 2 and 4 and discharged to the confluence region to wet each passage surface, and on this timing EVOH is introduced at a breath from the entrance 3. Black area A designates TR.

In FIG. 13(2) where EVOH has already been introduced, the flow passage surface is covered with TR to pevent an instantaneous sticking of EVOH. Hatched area of B shows EVOH. That is, PES is introduced to form FIG. 13(2). This type of starting method can prevent EVOH from sticking or invasion into other passages, and high-temperature PES from invading into the EVOH passage, making possible a good molding. In the case where the above method is not adopted and firstly EVOH is introduced, the EVOH invades into other passages and sticks thereto, and then stagnates and gels on the passage surface, which gels are difficult to substitute. Particularly, the EVOH having invaded into the TR passage will, since the viscosity of TR is not high and the shear stress of TR at a low flow rate is small, stick to the TR passage and remain there not fully put out and substituted, to deteriorate and gel further, depositing on the passage surface to cause streaks and grains. In the case when firstly PES is started, the PES invades into the EVOH passage. PES having adhered to the EVOH passage cannot, due to its high viscosity, be smoothly put out and substituted with EVOH discharged next, and forms a stagnation, as well as promotes thermal degradation of EVOH contacting the high temperature PES. Needless to say that when starting up it is necessary that the passage surfaces have been fully cleaned beforehand and that polymers (particularly EVOH) to be introduced be clean ones containing no foreign matters or unmolten matters.

Another method of starting up will be explained next. This is a method of starting with polymers of low viscosities and then substituting them. This method comprises starting up the molding by once extruding polymers having low viscosities and thereafter substituting them with normal polymers for molding. Here employed is a method using the same polymers as those used for the molding, having low viscosities; whereas also effective is a method using other polymers such as polyethylene (PE) and polypropylene (PP).

According to this method of substituting the same or other polymers having low viscosities, the timing of changing over need not be strictly controlled and there rarely occurs a failure, provided that the discharging order meet characteristics of polymers used and conditions be selected properly. Examples of practical order of extrusion and substitution are as follows; wherein (L) designates a low viscosity polymer and (N) designates a normal polymer.

(i) (L) (2nd and 4th layers) TR→(L) (3rd layer) EVOH→(L) (1st and 5th layers) PES→(N) (2nd and 4th layer) TR→(N) (1st and 5th layers) PES→(N) (3rd layer (EVOH (ii) (2nd and 4th layers) PE→(L) (1st and 5th layers) PE→(N) (3rd layer) EVOH→(N) (2nd and 4th layer) TR→(N) (1st and 5th layers) PES (iii) (L) (2nd and 4th layers) TR→(L) (3rd layer) EVOH→(N) (1st and 5th layers) PES→(N) (2nd and 4th layer) TR→(N) (3rd layer) EVOH Depending on the kinds of substituted resins, starting with polymers of a relatively low temperature followed by changing over to normal molding conditions will also be effective.

Polystyrene, nylon, high-modified PES, and the like are also useful as polymers to be substituted. EVOH having a low viscosity used herein is selected from grades having a good thermal stability.

As still other methods for starting up, there are useful methods including a method which comprises adjusting extrusion rates of PES, EVOH and TR to obtain good flows, a method comprises cooling and substituting the inside of the die and the polymer passages (particularly EVOH passage) with an inert gas, and a method which comprises starting with polymers including PES, which can be extrudable at a low temperature of 200° to 250° C.

Next, explanations are made on multilayered containers obtained from the multilayered tubes of this invention.

There can be obtained a bottle having a good appearance substantially without streaks and being excellent in gas barrier properties, pressure proofness, shock resistance and transparency, by making a preform from the multilayered tube having the above structure and carrying out biaxial blow molding thereof. Defects in appearance (streaks) which are seen linearly continuously in the longitudinal direction on the bottle body, are the ones observed as longitudinal streaky irregularities in appearance, each one of which is caused by nonuniform refraction of light through a resin lens formed by irregularity of thickness extending linearly in the longitudinal direction on the bottle body. This defect becomes a clearer streak as it grows big exceeding a certain size, which make the appearance nonuniform and feeling of nonequal quality, and the bottle loses the commercial value. The streaks of the bottle will further be elucidated below.

The bottle having substantially no streaks as used in this description means a bottle, excluding one having streaks originating from a shift of the matching planes of a mold or streaks added for decoration purpose, having utterly no logitudinally continuous region of optical nonuniformity on the bottle body caused by slight nonuniformities in thickness of the body wall, as well as ones of good appearance which do not have irregular streaks of clearliness of such degree as to spoil the appearance and to make a person who uses the bottle feel that the bottle is not good or has an unpleasant feeling.

As the result of a study on streaks on the bottles obtained by making preforms from tubes and biaxially blow molding them, it has been found that, among streaky nonuniformities on EVOH layer of the bottle body, such nonuniformity is clearly recognized as a streak that has a ratio of the difference between the maximum thickness (tmax) and the minimum thickness (tmin) in a segment in the EVOH layer between two points 100 to 500$\mu$ circumpherentially apart from each other to the distance of the two points (L), that is, (tmax−tmin)/L is 1/1000 or higher. When a streak of this size is present on the bottle, the bottle will look bad and decrease its commercial value.

On the other hand a circumferential portion (EVOH layer) having the ratio of (tmax−tmin)/L of less than 1/1000 does not spoil the appearance quality of the bottle and does not decrease the commercial value of the bottle.

Figure 1:
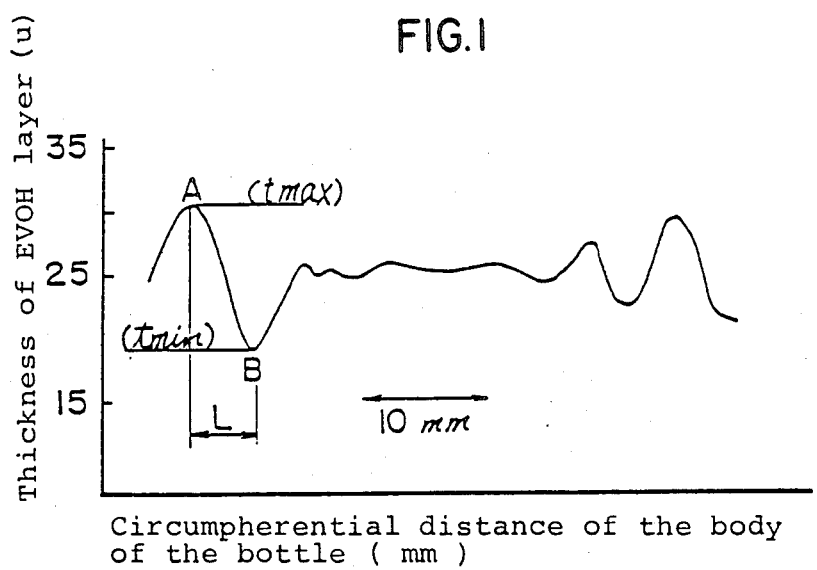
FIG. 1 shows a circumferential distribution of thickness of EVOH layer in the cross section of bottle body {point A: maximum thickness (tmax); point B: minimum thickness (tmin); distance between tmax and tmin (L)}, wherein the abscissa represents circumferential distance and the ordinate represents thickness of EVOH layer.

FIG. 1 shows a graph of thickness distribution circumferentially continuously measured on a specimen having an average thickness of 25$\mu$ of EVOH layer which specimen was taken from a circumpherence of the bottle body of a PES/EVOH multilayered bottle. Measurement of thickness was done on the specimen of EVOH layer being moved at a constant rate, by using a continuous thickness tester having a curved surface probe $R_3$. Any instrument, however, can be used in so far as it can measure local thicknesses at the same level of precision. The ordinate represents the thickness of the EVOH layer in $\mu$, and the abscissa represents the circumferential distance of the bottle body in mm.

FIG. 1 shows that the thickness of the EVOH layer is not uniform and that there are nonuniformities in thickness.

Among the nonuniformities there are observed various ones such as one having a big difference in the heights of a mountain and a valley, one in which the distance between a mountain and a valley is small, one having a small difference of heights between a mountain and a valley, etc. As shown in FIG. 1, point A is marked on the peak of a mountain in the thickness distribution curve, then B is marked on any point not less than 0.1 mm apart from A, and the difference of the thicknesses of EVOH layer at points A and B (tmax−tmin) and the distance between A and B (L) are measured, followed by calculation of the ratio (tmax−tmin)/L. On a bottle having streaks which spoils the appearance and makes a person who uses the bottle feel that it is a bad bottle and has an unpleasant feeling, more than one part having the above ratio of 1/1000 are observed among the streaks.

On the other hand, on a bottle having substantially no streaks, that is, a bottle which does not have a streak of such clearliness as to give a bad impression and damage the commercial value of the bottle, there can not be found a portion having the above ratio of not less than 1/1000.

In this way it is possible to distinguish a bad streaky nonuniformity from a harmless streaky nonuniformity from the results of measurement of the thickness distribution of the EVOH layer of the bottle.

Preparation of a multilayered container from the multilayered tube of this invention is carried out as follows:

After cutting the multilayered tube to segments of a prescribed length, a neck part (mouth and thread) is prepared and simultaneously with or prior to or after the above, the other end of the segment is sealed by heating and fusing to give a preform. The preform is mounted on a biaxial blow molding machine and is subjected to heat biaxial blow molding to give a multilayered container (bottle) having substantially no streaks and having a beautiful appearance.

As methods for performing biaxial blow molding of the preform, any known method such as sequential blow molding method or simultaneous blow molding can be employed. For example, in case of sequential blow molding, there is a method which comprises drawing a parison, while inserting therein a extruding bar and blowing a gas thereinto under a relatively small pressure, and thereafter while blowing thereinto a gas under a relatively high pressure drawing it circumferentially. In case of simultaneous blow molding, there is a method which comprises carrying out both circumferential and axial drawings simultaneously while blowing into a gas under a large pressure. As the gases blown into at the blow molding, there can be used air, nitrogen gas, heated air, steam and the like. The axial drawing is readily performed by for example, while grasping the mouth of a parison with the mold and the mandrel and applying a drawing bar to the inside of the bottom of the parison, extending the drawing bar.

It is preferred that the drawing ratio in the axial direction be not less than 1.5 times the preform length and that in the circumferential (radial) direction be not less than 2.5 times the bottle diameter. Particularly, in the case where the radial drawing ratio is small, the drawing of EVOH layer is insufficient and there tends to occur nonuniform drawing to make worse the bottle appearance as well as decrease mechanical strength. Further if the radial drawing raio is made more than 3, since the drawability is increased because the EVOH layer is co-drawn with PES layers, unless there is no local irregularities of thickness or others, a uniform drawing can be performed to minimize generation of streaks which worsen the appearance and decrease the commercial value. The preferred range for the radial drawing ratio is 2.5 to 5. The preferred range of the axial drawing ratio is 1.5 to 5, and that of total drawing ratio (radial drawing ratio×axial drawing ratio) is 5 to 20, more preferably 5 to 15.

Heating of preforms for conducting a biaxial blow molding is done at a temperature 75° to 130° C., and it is preferred for obtaining a bottle of better appearance to heat at 80° to 125° C.

The thus obtained bottle has as described before substantially no streaks and is not only of a beautiful appearance but also excellent in gas barrier property, etc. and so preferably used for bottles for filling foods, beverages, alcohols, particularly carbonated drinks and beers, as well as medicines, cosmetics and the like.

In this invention, whereas biaxial blow molding is mentioned as a representative example of molding of a multilayered tube for molding, there is also possible a method which comprises drawing the obtained tube radially or both radially and axially to enlarge the tube diameter, cutting the enlarged tube to suitable lengths, and providing a stopper each at both ends thereof to give a can-shaped container.

Hereinbelow the invention is illustrated with reference to Examples, but the invention is by no means limited by the Examples.

EXAMPLE 1

A polyethylene terephthalate resin having MI at 255° C. of 4{[$\eta$]=1.0, MP determined by measurement with DSC (at a scanning speed of 20° C.) of 250° C.}, a saponified product of ethylene-vinyl acetate copolymer having an ethylene content of 32 mol%, a saponification degree of 99.5 mol% and MI at 255° C. of 6 (MP: 181° C., moisture content: 1000 ppm, containing no irregularly polymerized or degraded matters) and a modified polyester resin bonded with aluminum atom in an amount of 450 ppm and with benzoic acid {MI at 255° C.: 25, MP: 105° C., and E(TR) measured at 35° C.: 1500 kg/cm$^2$} described in JPA No. 115327/1984 were separately extruded from three extruders, supplied while adjusting the discharging timing to a die for molding 3 kind/5 layer tube, the temperatures of the die and the entrances thereof being 245° C., and 280° C. (PET), 250° C. (EVOH) and 230° C. (TR) respectively, to form a tube at a rate of 5 m/min to obtain a tube having an outer diameter of about 25 mm and a length of 75 mm. The tube was prepared by a manufacturing process shown in FIG. 5.

Extrusion conditions for PET:

As the extruder 1-A, an extruder of high kneading and low heat generation type, equipped with a cooling device on the delivery part of metalling zone thereof was used.

A thermogenizer (for cooling) was mounted onto the polymer passage 2-A.

Variation of output was ±1.5% or below.

Variation of extrusion temperatures was ±2° C. or below.

Variation of extrusion pressure was ±2% or below.

Extrusion conditions for EVOH:

As the extruder 1-B, an extruder of high kneading and low heat generation type, which does not form stagnation was used.

A thermogenizer (for cooling) was mounted onto the polymer passage 2-B.

The rate of shear at the metalling zone was: $\dot{\gamma}=50$ sec$^{-1}$.

The flow passage surface was plated with hard chrome and finished to specular gloss.

The average flow rate of EVOH in the die was 1.2 cm/sec or higher.

The rate of shear of EVOH in the die was 5 sec$^{-1}$.

Both the polymer passages 2-A (PET) and 2-B (EVOH) were equipped with purging valves.

As the co-extrusion die shown in FIG. 5, employed was a die of the confluence system given in FIG. 7(3). The 3 kind/5 layer die was assembled utilizing spigot joints and dowel pins, and the gauges of the slits for discharging the resins were checked over their entire circumferences and adjusted to a tolerance of 50$\mu$ or below for PET, 30$\mu$ or below for the adhesive resin, 20$\mu$ or below for EVOH. The average gauge of each slit was adjusted to 2 mm, 1 mm and 1 mm for PET, EVOH and the adhesive resin respectively. The adjustment was done by operating adjusting bolts for the mandrel position mounted on the 3 kind/5 layer die.

After substituting all the polymer passages and the inside of the die with nitrogen gas prior to charging of the polymers, extrusion was performed starting with TR in sequence. The melts extruded from the die were introduced through a sizing device 5 shown in FIG. 5 (vacuum sizing device cooled externally) and a cooling tank 6 (atmospheric pressure) to be taken up with a take-up apparatus 7 (top and bottom belts type), followed by cutting with a cutter 8 to desired lengths to give tubes having an outer diameter of about 25 mm.

The cross sections of the thus obtained tubes were checked with a microscope for the thickness of each layer, and the thicknesses were adjusted, in the course of molding tubes, with adjusting bolts for thickness to such a degree that the thickness nonuniformities fell within acceptable ranges of this invention. Any change of extrusion conditions was done gradually so that no abrupt pressure change would occur in the die.

A sketch of a cross section of the 3 kind/5 layer tube comprising PET as the inner and outer layers, EVOH as the intermediate layer and adhesive resin layers between the above two resin layers is shown in FIG. 8. The thicknesses measured on each layer of the obtained tube are shown in Table 1.

The 3 kind/5 layer tube was cut at 1−cm intervals, the EVOH layers were taken therefrom. After removing the adhesive resin sticking to the surface of the EVOH specimens by swelling with acetone, and drying, the EVOH layers were measured for minute thickness nonuniformities. The difference in thickness between any two points on the circumference each of two cut surfaces (cross sections) not less than 100$\mu$ and not more than 500$\mu$ apart from each other was found to satisfy the following condition:

$(E\text{max} - E\text{min})/\frac{1}{2}(E\text{max} + E\text{min})Q \leq 10^{-5} \times$ $$\left(\frac{7.7}{\log Q - 0.73} + 2.2\right)$$

The 3 kind/5 layer tube also satisfied the tube construction conditions of the formulae I-①  to I-③, II, and IV-① to ⑬.

The tube was made into a preform by forming a mouth and a bottom on the both ends of thereof using a laboratory preform molding machine (LM-01, LM-02) made by KRUPP CORPOPLAST, and the preform was then heated to 100° C. and subjected to biaxial blow molding using a laboratory blow molding machine made by the same company at a drawing ratio of 10 (axial drawing ratio×radial drawing ratio) to give a bottle having a capacity of 0.5 l, a height of 17.5 cm and an outer diameter of 72 mmφ.

The thus obtained bottle was, as shown in FIG. 9, of a good appearance having substantially no streaks. The average thickness construction of the layers of the bottle body is shown in Table 5. The lateral thickness distribution of the EVOH layer taken out from the bottle body was as shown in FIG. 11 and shows no thickness irregularity compared to Comparative Example 1 (FIG. 12) and no streaks at all which would worsen the bottle appearance. The thickness distribution was measured using a continuous film thickness tester made by ANRITSU ELECTRIC.

EXAMPLE 2

A polyester resin having copolymerized 3.5 mol% of 1,4-cyclohexanedimethanol ($[\eta]=1.15$, MI at 255° C. of 1.5 and MP of 245° C.), a saponified product of ethylene-vinyl acetate copolymer having an ethylene content of 44 mol% and a saponification degree of 99.4 mol% (MI at 255° C. of 6.0, MP: 164° C.) and a modified polyester resin bonded with aluminum atom in an amount of 450 ppm and with benzoic acid (MI at 255° C.: 30, MP: 105° C.) described in JPA No. 115327/1984 are separately extruded from three extruders at temperatures of 270° C., 240° C. 220° C. respectively to a die for molding 3 kind/5 layer tube shown in FIG. 7(2) (the die temperature: 245° C.) to be subjected to a co-extrusion molding, followed by vacuum sizing, cooling, taking up and cutting to form into tubes at a rate of 4.0 m/min to give tubes having an outer diameter of about 25 mm and a length of 75 mm.

The assembling and adjustment of the die was carried out in the same manner as in Example 1 so that the gauges of the slits for discharging the resins on the entire circumferences were adjusted to tolerances of not more than 40μ, not more than 20μ and not more than 20μ for PET, EVOH and the adhesive resin respectively by operating adjusting bolts for the mandrel position mounted on the die. The average gauge of each slit was adjusted to 2 mm, 1 mm and 1 mm for PET, EVOH and the adhesive resin respectively. During the operation a change in operating conditions was done gradually in order that the pressure inside the die would not change abruptly. The extrusion conditions for PET, EVOH and TR were same as in Example 1 except for the extrusion temperature. The polymer passages 2-A, 2-B and 2-C were provided with purging valves and each polymer was discharged therethrough until a smooth extrusion was attained. After the extrusion of each resin became steady, the purging valves were switched over successively to introduce TR, EVOH and PET in sequence at an appropriate timing into the die.

The cross sections of the thus obtained tubes were, same as FIG. 8 in Example 1, of a small nonuniformities in thickness. The results are shown in Table 1.

The EVOH layers in the specimens cut at 1-cm intervals from the tubes were checked for thickness nonuniformity in the same manner as in Example 1. The difference in thickness between any two points on the circumference each of two cut surfaces (cross sections) not less than 100μ and not more than 500μ apart from each other was found to satisfy the condition II.

The tube was made into a preform using the laboratory machine described in Example 1, and the preform was then molded into a blow bottle at a drawing ratio of 10 and at 95° C. The obtained bottle had a capacity of 0.5 l, a height of 17.5 cm and an outer diameter of 72 mm, and showed substantially no streaks which would spoil the appearance of the bottle. Though compositions of PET and EVOH resins were different from those of Example 1, a proper selection of resin viscosities and attentions paid to consolidating the die and changing the operating conditions could lead to a preparation of a tube suitable for molding a bottle having an excellent appearance.

EXAMPLES 3 TO 9

One of PES resins of the same kind as in Example 2 having MI's given in Table 1 and Table 2, EVOH (MP: 179° C.) having an ethylene content of 33 mol% and a saponification degree of 99.5 mol% and an adhesive resin (a modified polyester resin bonded with an aluminum atom in an amount of 450 ppm and with benzoic acid, described in JPA No. 115,327/84; MP: 105° C.) were extruded using 3 extruders at temperatures of 270° C., 250° C. and 230° C. respectively to a die having a structure of FIG. 7(3) into 3 kind/5 layer tubes.

Assembling and operation were done in a similar manner to those in Example 2. Extrusion conditions for PET, EVOH and TR were nearly the same as in Example 1 except for the temperatures. The result of the moldings are summarized in Tables 1 and 2. The thickness nonuniformity between any two points on the circumference of an EVOH layer (cross section cut at 1-cm intervals) 100μ to 500μ distant from each other satisfied the condition II.

The obtained tubes were molded using the blow molding machine described in Example 1 (drawing ratio: 10, at 105° C.) into bottles having a capacity of 0.5 l, a height of 17.5 cm and a diameter of 72 mm.

The thus obtained bottles showed substantially no streaks which would spoil the appearance.

The constructions of the tubes and bottles obtained in Examples 1 to 9 are shown in Tables 1 and 2.

COMPARATIVE EXAMPLE 1

The same raw material chips as in Example 1 were subjected to a tube molding, changing the extrusion conditions for each resin and the order of introducing the resins into the die.

Each resin was first discharged just before the 3 kind/5 layer die, and when the extrusion state became stable, introduced into the die in the order of PET, high-viscosity EVOH and TR by switching over the valves. As to the timing of the introduction, after confirming the discharge of a resin from the front of the die, the valve for the next resin was switched over. For the tube molding, a die having a system of FIG. 7(3), which is also shown in FIGS. 6-(1) and -(2), was used. The assembling of the die and the adjustments of the die slits were carried out in the same way as in Example 1.

Extrusion of each resin was done in the same manner as in Example 1, except that the extrusion temperature for PET was 295° C., the extrusion temperature for EVOH was 295° C. and the rate of shear of EVOH in the metalling zone of the extruder and that in the die were 18 sec$^{-1}$ and 21 sec$^{-1}$ respectively, and the extrusion temperature for TR was 180° C.

The EVOH layer taken out from the obtained tube showed a number of streaky thickness nonuniformities in a direction parallel to the tube axis. In the EVOH layer (cross section cut at 1-cm intervals), there were observed not less than 13 spots in a cross section, and not less than 26 spots in total in two cross sections, the thickness nonuniformity between 2 points, 100μ to 500μ being apart from each other, of which does not satisfy the condition II.

The tube were molded with a machine described in Example 1 into preforms, which were then subjected to a biaxial blow molding to give bottles having a capacity of 0.5 l. On all of the thus obtained bottles, there were observed: clearly distinguishable streaks(S): ca 8 in average/bottle slightly distinguishable streaks: many and the bottle appearances were spoiled (FIG. 10). A bottle was selected at random from these bottles and then the EVOH layer was taken out, followed by measurement for thickness distribution using the before-described continuous thickness tester. The result is shown in FIG. 12. About 8 spots were found to have big differences in thickness and they were thought to be causing the bottle to show the clear streaks.

It was not successful to reduce these streaks and to improve the appearance of the bottle, though various adjustments had been conducted on blow molding conditions to find a most suitable condition. Conversely, some adjustments resulted in an increase of streaks. From the above it can be understood that for getting bottles having no streaks it is important to prepare tubes having no streaks and also to have molding technique of a high level.

COMPARATIVE EXAMPLES 2 TO 6

A PES having an [η] different from that in Example 1, a saponified product of ethylene-vinyl acetate copolymer (EVOH) having an ethylene content of 32 mol% and a saponification degree of 99.5 mol%, and an adhesive resin of similar kind to that in Example 2 were in combination molded into 3 kind/5 layer tubes having the EVOH as the intermediate layer in the same manner as in Example 1, wherein however, at least one of the three resins had a MI at 250° C. deviating from the preferred range. The results are shown in Table 3. The MI's of resins used in each one of the Comparative Examples were as shown in Table 3: MI of EVOH in Comparative Example 2, MI's of EVOH and PET in Comparative Example 3, MI's of EVOH, PET and TR in Comparative Example 4, MI or TR in Comparative Example 5 and MI's of PET in Comparative Example 6 were not in the preferred range respectively. Each EVOH layer was taken out from each one of the obtained tubes, and the cross sections thereof cut at 1-cm intervals were subjected to checks with a micrometer. Among the thickness nonuniformities between any two points 100μ to 500μ apart from each other, there were found not less than 4 spots in one cross section, and not less than 8 spots in two cross sections, the maximum thickness-nonuniformity portion of which spots do not satisfy the condition II.

These tubes were molded into preforms using a machine described in Example 1, followed by biaxial blow molding thereof to give bottles having a capacity of 0.5 l. On each bottle, there were observed not less than 4 clear streaks and a number of slightly distinguishable small streaks. The appearances of the bottles were as bad as those in Comparative Example 1 which is illustrated in FIG. 10. Any change in blow molding conditions could not lead to obtaining a bottle having a good appearance and having substantially no streaks.

From the above it can be understood that for getting bottles having no streaks it is important to prepare tubes having no streaks, and that for getting a tube having no streaks it is important to have MI of each starting resin fall in a preferred range, as well as to have a high technique of running the molding.

The constructions of the tubes and bottles obtained in Comparative Examples 1 to 6 are shown in Tables 3 and 4.

TABLE 1

| | Example 1 | | Example 2 | | Example 3 | | Example 4 | | Example 5 | |
|---|---|---|---|---|---|---|---|---|---|---|
| EVOH Layer (3rd Layer) | | | | | | | | | | |
| Average thickness (μ)$\overline{E}$ | 340 | | 280 | | 310 | | 290 | | 300 | |
| Max. thickness E (E/$\overline{E}$) | 400(1.18) | | 305(1.09) | | 345(1.11) | | 320(1.10) | | 330(1.10) | |
| Min. thickness E (E/$\overline{E}$) | 300(0.88) | | 250(0.89) | | 285(0.92) | | 275(0.95) | | 285(0.95) | |
| Max. value of Y in a range of 100 to 500μ | $5.1 \times 10^{-5}$ | | $3.4 \times 10^{-5}$ | | $3.4 \times 10^{-5}$ | | $4.2 \times 10^{-5}$ | | $2.8 \times 10^{-5}$ | |
| Number of spots not satisfying the condition II (sum of 2 cross sections) | 0 | | 0 | | 0 | | 0 | | 0 | |
| MI | 6.0 | | 8.0 | | 3.0 | | 10.0 | | 3.0 | |
| Adhesive Resin Layer (2rd and 4th Layers) | | | | | | | | | | |
| (Thickness μ) | 2nd | 4th | 2nd | 4th | 2nd | 4th | 2nd | 4th | 2nd | 4th |
| Average $\overline{C}$, $\overline{D}$ | 80 | 80 | 70 | 60 | 75 | 75 | 80 | 75 | 80 | 70 |
| Max. Cmax, Dmax | 90 | 95 | 80 | 75 | 85 | 90 | 90 | 85 | 90 | 85 |
| Min. Cmin, Dmin | 70 | 60 | 60 | 50 | 60 | 60 | 70 | 60 | 70 | 60 |
| Cmax/$\overline{C}$, Dmax/$\overline{D}$ | 1.13 | 1.19 | 1.14 | 1.25 | 1.13 | 1.20 | 1.13 | 1.13 | 1.13 | 1.21 |
| Cmin/$\overline{C}$, Dmin/$\overline{D}$ | 0.89 | 0.75 | 0.86 | 0.83 | 0.80 | 0.80 | 0.88 | 0.80 | 0.88 | 0.86 |
| MI | 25.0 | | 30.0 | | 30.0 | | 30.0 | | 15.0 | |
| PET Layer (1st and 5th layers) | | | | | | | | | | |
| (Thickness) | 1st | 5th | 1st | 5th | 1st | 5th | 1st | 5th | 1st | 5th |
| Average $\overline{A}$, $\overline{B}$ | 1900 | 1050 | 2300 | 800 | 1500 | 1500 | 1600 | 1400 | 1950 | 1100 |
| Maximum Amax, Bmax | 2100 | 1200 | 2500 | 900 | 1700 | 1650 | 1800 | 1600 | 2150 | 1200 |
| Minimum Amin, Bmin | 1700 | 930 | 2060 | 700 | 1400 | 1300 | 1450 | 1260 | 1840 | 1000 |
| Amax/$\overline{A}$, Bmax/$\overline{B}$ | 1.11 | 1.14 | 1.09 | 1.13 | 1.13 | 1.10 | 1.13 | 1.14 | 1.10 | 1.09 |
| Amin/$\overline{A}$, Bmin/$\overline{B}$ | 0.89 | 0.89 | 0.90 | 0.88 | 0.93 | 0.87 | 0.91 | 0.90 | 0.94 | 0.91 |

TABLE 1-continued

| | Example 1 | Example 2 | Example 3 | Example 4 | Example 5 |
|---|---|---|---|---|---|
| $\overline{B}/\overline{A}$ | 0.55 | 0.35 | 1.00 | 0.88 | 0.564 |
| $E/(\overline{A} + \overline{B})$ | 0.115 | 0.090 | 0.103 | 0.096 | 0.098 |
| MI | 4.0 | 1.5 | 1.5 | 1.5 | 4.0 |
| Wall Thickness of Tube | | | | | |
| Average $\overline{Z}$ | 3.5 | 3.5 | 3.5 | 3.5 | 3.5 |
| Maximum Zmax | 3.6 | 3.6 | 3.6 | 3.6 | 3.6 |
| Minimum Zmin | 3.3 | 3.4 | 3.4 | 3.4 | 3.4 |
| Zmax/$\overline{Z}$ | 1.04 | 1.03 | 1.03 | 1.04 | 1.03 |
| Zmin/$\overline{Z}$ | 0.96 | 0.97 | 0.97 | 0.97 | 0.97 |
| Outer Diameter of Tube | | | | | |
| Average $\overline{H}$ | 25.0 | 25.0 | 25.0 | 25.0 | 25.0 |
| Maximum Hmax | 25.3 | 25.2 | 25.2 | 25.2 | 25.1 |
| Minimum Hmin | 24.7 | 24.8 | 24.8 | 24.9 | 24.8 |
| Hmax/$\overline{H}$ | 1.01 | 1.01 | 1.01 | 1.01 | 1.00 |
| Hmin/$\overline{H}$ | 0.99 | 0.99 | 0.99 | 0.99 | 0.99 |
| Ratio of MI's | | | | | |
| MI(EVOH)/MI(PET) | 1.5 | 5.3 | 2.0 | 6.7 | 0.8 |
| MI(TR)/MI(PET) | 6.3 | 20 | 20 | 20 | 3.8 |
| MI(TR)/MI(EVOH) | 4.2 | 3.8 | 10 | 3.0 | 5.0 |
| Bottle | | | | | |
| Appearance of bottle | good | good | good | good | good |
| Average thickness of EVOH layer | 34 | 29 | 30 | 30 | 29 |

TABLE 2

| | Example 6 | | Example 7 | | Example 8 | | Example 9 | |
|---|---|---|---|---|---|---|---|---|
| EVOH Layer (3rd Layer) | | | | | | | | |
| Average thickness (µ) E | 300 | | 300 | | 310 | | 300 | |
| Max. thickness E (E/$\overline{E}$) | 350(1.17) | | 365(1.22) | | 360(1.16) | | 370(1.23) | |
| Min. thickness E (E/$\overline{E}$) | 270(0.9) | | 265(0.88) | | 280(0.9) | | 265(0.88) | |
| Max. value of Y in a range of 100 to 500µ | $4.2 \times 10^{-5}$ | | $5.3 \times 10^{-5}$ | | $4.5 \times 10^{-5}$ | | $5.5 \times 10^{-5}$ | |
| Number of spots not satisfying the condition II (sum of 2 cross sections) | 0 | | 0 | | 0 | | 0 | |
| MI | 10.0 | | 15 | | 10.0 | | 10.0 | |
| Adhesive Resin Layer (2rd and 4th Layers) | | | | | | | | |
| (Thickness µ) | 2nd | 4th | 2nd | 4th | 2nd | 4th | 2nd | 4th |
| Average $\overline{C}$, $\overline{D}$ | 80 | 70 | 75 | 75 | 80 | 80 | 80 | 75 |
| Max. Cmax, Dmax | 90 | 80 | 90 | 90 | 95 | 95 | 95 | 95 |
| Min. Cmin, Dmin | 70 | 60 | 60 | 60 | 65 | 60 | 60 | 55 |
| Cmax/$\overline{C}$, Dmax/$\overline{D}$ | 1.13 | 1.14 | 1.20 | 1.20 | 1.19 | 1.19 | 1.19 | 1.27 |
| Cmin/$\overline{C}$, Dmin/$\overline{D}$ | 0.88 | 0.86 | 0.80 | 0.80 | 0.81 | 0.75 | 0.75 | 0.73 |
| MI | 15.0 | | 15.0 | | 30.0 | | 50.0 | |
| PET Layer (1st and 5th layers) | | | | | | | | |
| (Thickness) | 1st | 5th | 1st | 5th | 1st | 5th | 1st | 5th |
| Average $\overline{A}$, $\overline{B}$ | 2050 | 1000 | 1950 | 1050 | 1600 | 1500 | 1600 | 1450 |
| Maximum Amax, Bmax | 2200 | 1100 | 2150 | 1200 | 1800 | 1660 | 1850 | 1600 |
| Minimum Amin, Bmin | 1850 | 940 | 1750 | 900 | 1450 | 1340 | 1400 | 1300 |
| Amax/$\overline{A}$, Bmax/$\overline{B}$ | 1.07 | 1.10 | 1.10 | 1.14 | 1.13 | 1.11 | 1.16 | 1.10 |
| Amin/$\overline{A}$, Bmin/$\overline{B}$ | 0.90 | 0.94 | 0.90 | 0.86 | 0.91 | 0.89 | 0.88 | 0.90 |
| $\overline{B}/\overline{A}$ | 0.488 | | 0.538 | | 0.938 | | 0.906 | |
| $E/(\overline{A} + \overline{B})$ | 0.098 | | 0.100 | | 0.100 | | 0.098 | |
| MI | 4.0 | | 4.0 | | 7.0 | | 7.0 | |
| Wall Thickness of Tube | | | | | | | | |
| Average $\overline{Z}$ | 3.5 | | 3.45 | | 3.5 | | 3.5 | |
| Maximum Zmax | 3.6 | | 3.6 | | 3.6 | | 3.7 | |
| Minimum Zmin | 3.3 | | 3.3 | | 3.3 | | 3.2 | |
| Zmax/$\overline{Z}$ | 1.03 | | 1.04 | | 1.03 | | 1.06 | |
| Zmin/$\overline{Z}$ | 0.96 | | 0.96 | | 0.94 | | 0.91 | |
| Outer Diameter of Tube | | | | | | | | |
| Average $\overline{H}$ | 25.0 | | 25.0 | | 25.0 | | 25.0 | |
| Maximum Hmax | 25.2 | | 25.2 | | 25.3 | | 25.3 | |
| Minimum Hmin | 24.8 | | 24.8 | | 24.8 | | 24.7 | |
| Hmax/$\overline{H}$ | 1.01 | | 1.008 | | 1.01 | | 1.01 | |
| Hmin/$\overline{H}$ | 0.99 | | 0.992 | | 0.99 | | 0.99 | |
| Ratio of MI's | | | | | | | | |
| MI(EVOH)/MI(PET) | 2.5 | | 3.8 | | 1.4 | | 1.4 | |
| MI(TR)/MI(PET) | 3.8 | | 3.8 | | 4.3 | | 7.1 | |
| MI(TR)/MI(EVOH) | 1.5 | | 1.0 | | 3.0 | | 5.0 | |
| Bottle | | | | | | | | |

TABLE 2-continued

|  | Example 6 | Example 7 | Example 8 | Example 9 |
|---|---|---|---|---|
| Appearance of bottle | good | good | good | good |
| Average thickness of EVOH layer | 29 | 29.5 | 30.5 | 30 |

TABLE 3

|  | Comparative Example 1 | | Comparative Example 2 | | Comparative Example 3 | |
|---|---|---|---|---|---|---|
| EVOH Layer (3rd Layer) | | | | | | |
| Average thickness ($\mu$) $\overline{E}$ | 350 | | 250 | | 300 | |
| Max. thickness E (E/$\overline{E}$) | 430(1.23) | | 300(1.20) | | 365(1.22) | |
| Min. thickness E (E/$\overline{E}$) | 280(0.8) | | 210(0.84) | | 270(0.9) | |
| Max. value of Y in a range of 100 to 500$\mu$ | $18.5 \times 10^{-5}$ | | $7.8 \times 10^{-5}$ | | $8.3 \times 10^{-5}$ | |
| Number of spots not satisfying the condition II (sum of 2 cross sections) | more than $2 \times 13$ | | more than $2 \times 8$ | | more than $2 \times 10$ | |
| MI | 6.0 | | 30.0 | | 30.0 | |
| Adhesive Resin Layer (2rd and 4th Layers) | | | | | | |
| (Thickness $\mu$) | 2nd | 4th | 2nd | 4th | 2nd | 4th |
| Average $\overline{C}$, $\overline{D}$ | 80 | 75 | 50 | 60 | 70 | 80 |
| Max. Cmax, Dmax | 95 | 90 | 75 | 80 | 95 | 95 |
| Min. Cmin, Dmin | 60 | 60 | 30 | 40 | 50 | 60 |
| Cmax/$\overline{C}$, Dmax/$\overline{D}$ | 1.06 | 1.2 | 1.50 | 1.33 | 1.36 | 1.19 |
| Cmin/$\overline{C}$, Dmin/$\overline{D}$ | 0.75 | 0.8 | 0.60 | 0.67 | 0.71 | 0.75 |
| MI | 25 | | 30 | | 30 | |
| PET Layer (1st and 5th layers) | | | | | | |
| (Thickness) | 1st | 5th | 1st | 5th | 1st | 5th |
| Average $\overline{A}$, $\overline{B}$ | 1800 | 1100 | 1900 | 1200 | 2000 | 1000 |
| Maximum Amax, Bmax | 2200 | 1250 | 2100 | 1350 | 2500 | 1340 |
| Minimum Amin, Bmin | 1650 | 1000 | 1750 | 1060 | 1520 | 660 |
| Amax/$\overline{A}$, Bmax/$\overline{B}$ | 1.22 | 1.14 | 1.11 | 1.13 | 1.28 | 1.34 |
| Amin/$\overline{A}$, Bmax/$\overline{B}$ | 0.92 | 0.91 | 0.92 | 0.88 | 0.76 | 0.66 |
| $\overline{B}/\overline{A}$ | 0.61 | | 0.63 | | 0.50 | |
| $\overline{E}/(\overline{A} + \overline{B})$ | 0.12 | | 0.08 | | 0.10 | |
| MI | 4.0 | | 4.0 | | 15.0 | |
| Wall Thickness of Tube | | | | | | |
| Average $\overline{Z}$ | 3.5 | | 3.5 | | 3.5 | |
| Maximum Zmax | 3.6 | | 3.7 | | 3.9 | |
| Minimum Zmin | 3.3 | | 3.2 | | 2.7 | |
| Zmax/$\overline{Z}$ | 1.03 | | 1.06 | | 1.11 | |
| Zmin/$\overline{Z}$ | 0.94 | | 0.91 | | 0.77 | |
| Outer Diameter of Tube | | | | | | |
| Average $\overline{H}$ | 25.0 | | 25.0 | | 25.0 | |
| Maximum Hmax | 25.2 | | 25.3 | | 25.4 | |
| Minimum Hmin | 24.7 | | 24.7 | | 24.7 | |
| Hmax/$\overline{H}$ | 1.01 | | 1.01 | | 1.02 | |
| Hmin/$\overline{H}$ | 0.99 | | 0.99 | | 0.99 | |
| Ratio of MI's | | | | | | |
| MI(EVOH)/MI(PET) | 1.5 | | 7.5 | | 2.0 | |
| MI(TR)/MI(PET) | 6.3 | | 7.5 | | 2.0 | |
| MI(TR)/MI(EVOH) | 4.2 | | 1.0 | | 1.0 | |
| Bottle | | | | | | |
| Appearance of bottle | streaks | | streaks | | streaks | |
| Average thickness of EVOH layer | 34 | | 24 | | 29 | |

TABLE 4

|  | Comparative Example 4 | Comparative Example 5 | Comparative Example 6 |
|---|---|---|---|
| EVOH Layer (3rd Layer) | | | |
| Average thickness ($\mu$) $\overline{E}$ | 300 | 300 | 300 |
| Max. thickness E (E/$\overline{E}$) | 375(1.25) | 380(1.27) | 360(1.20) |
| Min. thickness E (E/$\overline{E}$) | 250(0.83) | 245(0.82) | 250(0.83) |
| Max. value of Y in a range of 100 to 500$\mu$ | $12.3 \times 10^{-5}$ | $13.6 \times 10^{-5}$ | $9.2 \times 10^{-5}$ |
| Number of spots not satisfying the condition II (sum of 2 cross sections) | more than $2 \times 10$ | more than $2 \times 10$ | more than $2 \times 4$ |
| MI | 30.0 | 6.0 | 6.0 |
| Adhesive Resin Layer | | | |

TABLE 4-continued

|  | Comparative Example 4 | | Comparative Example 5 | | Comparative Example 6 | |
|---|---|---|---|---|---|---|
| (2rd and 4th Layers) | | | | | | |
| (Thickness μ) | 2nd | 4th | 2nd | 4th | 2nd | 4th |
| Average $\bar{C}, \bar{D}$ | 75 | 75 | 80 | 80 | 80 | 75 |
| Max. Cmax, Dmax | 105 | 115 | 125 | 110 | 95 | 95 |
| Min. Cmin, Dmin | 35 | 40 | 35 | 30 | 55 | 55 |
| Cmax/$\bar{C}$, Dmax/$\bar{D}$ | 1.40 | 1.53 | 1.56 | 1.38 | 1.19 | 1.27 |
| Cmin/$\bar{C}$, Dmin/$\bar{D}$ | 0.47 | 0.53 | 0.43 | 0.37 | 0.68 | 0.73 |
| MI | 95 | | 105 | | 30 | |
| PET Layer | | | | | | |
| (1st and 5th layers) | | | | | | |
| (Thickness) | 1st | 5th | 1st | 5th | 1st | 5th |
| Average $\bar{A}, \bar{B}$ | 1950 | 1050 | 2050 | 1000 | 1600 | 1450 |
| Maximum Amax, Bmax | 2330 | 1330 | 2260 | 1150 | 2020 | 1700 |
| Minimum Amin, Bmin | 1520 | 740 | 1800 | 900 | 1190 | 1110 |
| Amax/$\bar{A}$, Bmax/$\bar{B}$ | 1.19 | 1.27 | 1.10 | 1.15 | 1.26 | 1.17 |
| Amin/$\bar{A}$, Bmin/$\bar{B}$ | 0.78 | 0.70 | 0.88 | 0.90 | 0.74 | 0.76 |
| $\bar{B}/\bar{A}$ | 0.54 | | 0.49 | | 0.91 | |
| $\bar{E}/(\bar{A}+\bar{B})$ | 0.10 | | 0.10 | | 0.10 | |
| MI | 15.0 | | 7.0 | | 15.0 | |
| Wall Thickness of Tube | | | | | | |
| Average $\bar{Z}$ | 3.5 | | 3.5 | | 3.5 | |
| Maximum Zmax | 4.2 | | 3.6 | | 3.8 | |
| Minimum Zmin | 2.8 | | 3.3 | | 2.9 | |
| Zmax/$\bar{Z}$ | 1.20 | | 1.03 | | 1.08 | |
| Zmin/$\bar{Z}$ | 0.80 | | 0.95 | | 0.83 | |
| Outer Diameter of Pipe | | | | | | |
| Average $\bar{H}$ | 25.0 | | 25.0 | | 25.0 | |
| Maximum Hmax | 25.5 | | 25.3 | | 25.5 | |
| Minimum Hmin | 24.5 | | 24.7 | | 24.6 | |
| Hmax/$\bar{H}$ | 1.02 | | 1.01 | | 1.02 | |
| Hmin/$\bar{H}$ | 0.98 | | 0.99 | | 0.98 | |
| Ratio of MI's | | | | | | |
| MI(EVOH)/MI(PET) | 2.0 | | 0.86 | | 0.4 | |
| MI(TR)/MI(PET) | 6.3 | | 15.0 | | 2.0 | |
| MI(TR)/MI(EVOH) | 3.2 | | 17.5 | | 5.0 | |
| Bottle | | | | | | |
| Appearance of bottle | streaks | | streaks | | streaks | |
| Average thickness of EVOH layer | 29 | | 30 | | 30 | |

TABLE 5

|  | Example 1 | Example 2 | Example 3 | Example 4 | Example 5 | Comparative Example 1 | Comparative Example 2 | Comparative Example 3 |
|---|---|---|---|---|---|---|---|---|
| Average thickness of the 5th layer (outer PET layer) (μ) | 105 | 80 | 155 | 150 | 115 | 110 | 120 | 100 |
| Average thickness of the 4th layer (adherive resin layer) (μ) | 8 | 6 | 8 | 7 | 7 | 7 | 6 | 8 |
| Average thickness of the 3th layer (EVOH) (μ) | 34 | 29 | 30 | 30 | 29 | 34 | 24 | 29 |
| Average thickness of the 2th layer (adherive resin layer) (μ) | 8 | 7 | 7 | 7 | 8 | 8 | 5 | 7 |
| Average thickness of the 1th layer (inner PET layer) (μ) | 190 | 230 | 140 | 150 | 180 | 180 | 190 | 200 |
| Appearance of bottle (streaks) | good no streaks | good no streaks | good no streaks | good no streaks | good no streaks | no good big streaks :8 small streaks :many | no good big streaks :4 small streaks :many | no good big streaks :6 small streaks :many |
| tmax−tmin/L | 1/1000 or below | 1/1000 or below | 1/1000 or below | 1/1000 or below | 1/1000 or below | 1/1000 more than | 1/1000 more than | 1/1000 more than |
| Buckling strength (kg) | 29 | 26 | 24 | 25 | 25 | 24 | 24 | 22 |

What is claimed is:

1. A multilayered tube used for draw molding, which comprises a saturated polyester as the inner and outer layers, a saponified product of ethylene-vinyl acetate copolymer having an ethylene content of 20 to 55 mol% and a saponification degree of vinyl acetate component of at least 96 mol%, and adhesive resin layers interposed between the saturated polyester layers and the saponified product of ethylene-vinyl acetate copolymer layer; which satisfies the conditions of the following formulae I-①to I-③:

$$50\mu \leq E \leq 1000\mu \qquad \text{I-①}$$

$$1-0.01H \leq E/\overline{E} \leq 1+0.01H \qquad \text{I-②}$$

$$\overline{E}/(\overline{A}+\overline{B}) \leq 0.2 \qquad \text{I-③}$$

wherein,
E: wall thickness at any spot of the layer of a saponified product of ethylene-vinyl acetate copolymer ($\mu$)
$\overline{E}$: average wall thickness of the layer of a saponified product of ethylene-vinyl acetate copolymer ($\mu$)
$\overline{H}$: average outer diameter of the tube (mm)
$\overline{A}$: average wall thickness of the inner layer of the saturated polyester ($\mu$)
$\overline{B}$: average wall thickness of the outer layer of the saturated polyester ($\mu$);
and in which the layer of a saponified product of ethylene-vinyl acetate copolymer substantially satisfies the following formula II:

$$\frac{E\max - E\min}{\frac{1}{2}(E\max + E\min)Q} \leq 10^{-5} \times \left(\frac{7.7}{\log Q - 0.73} + 2.2\right) \qquad \text{II}$$

wherein:
Emin: the minimum wall thickness in $\mu$ of the layer of a saponified product of ethylene-vinyl acetate copolymer, in the cross section perpendicular to the direction of the tube length, at a point between any point $P_n$ and a point $P_{n+1}$ which is distant from $P_n$ by $Q=100$ to $500\mu$ in circumferential distance on the outer surface of the layer,
Emax: the maximum wall thickness in $\mu$ of the above specified region between $P_n$ and $P_{n+1}$.

2. A multilayered tube used for draw molding according to claim 1, wherein the following conditions III-① to III-⑥ are satisfied:

| | |
|---|---|
| 0.3 g/10 min $\leq$ MI(PES) $\leq$ 10 g/10 min | III-① |
| 1.0 g/10 min $\leq$ MI(EVOH) $\leq$ 25 g/10 min | III-② |
| 1.5 g/10 min $\leq$ MI(TR) $\leq$ 90 g/10 min | III-③ |
| 0.2 $\leq$ MI(EVOH)/MI(PES) $\leq$ 30 | III-④ |
| 0.5 $\leq$ MI(TR)/MI(PES) $\leq$ 60 | III-⑤ |
| 0.2 $\leq$ MI(TR)/MI(EVOH) $\leq$ 25 | III-⑥ |
| 80° C. $\leq$ MP(TR) $\leq$ MP(EVOH)+20° C. | III-⑦ |
| MP(TR) $\leq$ MP(PES)−20° C. | III-⑧ |
| 200 kg/cm² $\leq$ E(TR) $\leq$ 6000 kg/cm² | III-⑨ | wherein:
MI: Melt folw index (g/10 min) measured at a temperature 5° C. higher than the melting point of the saturated polyester,
PES: saturated polyester,
EVOH: a saponified product of ethylene-vinyl acetate copolymer
TR: adhesive resin
MP: melting point
E: Young's modulus.

3. A method of producing a multilayered container, which comprises preparing a preform from a multilayered tube used for blow molding, which comprises a saturated polyester as the inner and outer layers, a saponified product of ethylene-vinyl acetate copolymer having an ethylene content of 20 to 55 mol% and a saponification degree of vinyl acetate component of at least 96 mol%, and adhesive resin layers interposed between the saturated polyester layers and the saponificated product of ethylene-vinyl acetate copolymer layer; which satisfies the conditions of the following formulae I-① to I-③:

$$50\mu \leq E \leq 1000\mu \qquad \text{I-①}$$

$$1-0.01H \leq E/\overline{E} \leq 1+0.01H \qquad \text{I-②}$$

$$\overline{E}/(\overline{A}+\overline{B}) \leq 0.2 \qquad \text{I-③}$$

wherein,
E: wall thickness at any spot of the layer of a saponified product of ethylene-vinyl acetate copolymer ($\mu$)
$\overline{E}$: average wall thickness of the layer of a saponified product of ethylene-vinyl acetate copolymer ($\mu$)
$\overline{H}$: average outer diameter of the tube (mm)
$\overline{A}$: average wall thickness of the inner layer of the saturated polyester ($\mu$)
$\overline{B}$: average wall thickness of the outer layer of the saturated polyester ($\mu$);
and in which the layer of a saponified product of ethylene-vinyl acetate copolymer substantially satisfies the following formula II:

$$\frac{E\max - E\min}{\frac{1}{2}(E\max + E\min)Q} \leq 10^{-5} \times \left(\frac{7.7}{\log Q - 0.73} + 2.2\right) \qquad \text{II}$$

wherein:
Emin: the minimum wall thickness in $\mu$ of the layer of a saponified product of ethylene-vinyl acetate copolymer, in the cross section perpendicular to the direction of the tube length, at a point between any point $P_n$ and a point $P_{n+1}$ which is distant from $P_n$ by $Q=100$ to $500\mu$ in circumferential distance on the outer surface of the layer,
Emax: the maximum wall thickness in $\mu$ of the above specified region between $P_n$ and $P_{n+1}$;
and subjecting said preform to biaxial blow molding.

* * * * *

UNITED STATES PATENT AND TRADEMARK OFFICE
CERTIFICATE OF CORRECTION

PATENT NO. : 4,810,542
DATED : March 7, 1989
INVENTOR(S) : Syuji Kawai et al

It is certified that error appears in the above-identified patent and that said Letters Patent is hereby corrected as shown below:

IN THE SPECIFICATION:

Column 1, line 35 of the patent, delete "laminted" and insert in lieu thereof --laminated--.

IN THE CLAIMS:

In Claim 1, column 39, line 7 of the patent, change the formula I-②  "$1 - 0.01H \leq E/E \leq 1+0.01H$"  to -- $1-0.01\bar{H} \leq E/\bar{E} \leq 1+0.01\bar{H}$ --.

In Claim 1, column 39, line 9 of the patent, change the formula I-③ "$E/(A+B) \leq 0.2$" to -- $\bar{E}/(\bar{A}+\bar{B}) \leq 0.2$ --.

In Claim 3, column 40, line 26 of the patent, change the formula "$1-0.01H \leq E/E \leq 1+0.01H$" to -- $1-0.01\bar{H} \leq E/\bar{E} = 1+0.01\bar{H}$ --.

In Claim 3, column 40, line 28 of the patent, change the formula I-③ "$E/(A+B) \leq 0.2$" to -- $\bar{E}/(\bar{A}+\bar{B}) \leq 0.2$ --.

Signed and Sealed this

Fourth Day of July, 1989

*Attest:*

DONALD J. QUIGG

*Attesting Officer*       *Commissioner of Patents and Trademarks*